United States Patent [19]
Schroeder et al.

[11] Patent Number: 5,581,982
[45] Date of Patent: Dec. 10, 1996

[54] METHOD FOR AUTOMATICALLY BAGGING ICE USING A TIMER AND MULTIPOSITIONAL ELECTRONIC SCALE

[75] Inventors: Alfred A. Schroeder; Perry McGuar; Thomas J. Chadwell, all of San Antonio, Tex.

[73] Assignee: Packaged Ice, Inc.

[21] Appl. No.: 541,627

[22] Filed: Oct. 10, 1995

Related U.S. Application Data

[62] Division of Ser. No. 145,434, Oct. 29, 1993, Pat. No. 5,458,851.

[51] Int. Cl.$^6$ .................................................. B65B 43/26
[52] U.S. Cl. .................. 53/459; 53/502; 53/469; 53/473; 222/77; 222/643; 414/21; 177/64; 177/116; 141/83; 141/314; 141/317
[58] Field of Search .................. 53/459, 469, 473, 53/475, 479, 502, 73; 141/83, 314, 317; 222/73, 643; 414/21; 177/64, 116, 59

[56] References Cited

U.S. PATENT DOCUMENTS

| | | | |
|---|---|---|---|
| 3,416,619 | 12/1968 | McClusky | 53/502 |
| 4,689,937 | 9/1987 | Finan, Sr. et al. | 53/502 |
| 5,277,016 | 1/1994 | Williams et al. | 53/459 |
| 5,458,851 | 10/1995 | Shroeder et al. | 422/28 |

*Primary Examiner*—John Sipos
*Assistant Examiner*—John Paradiso
*Attorney, Agent, or Firm*—Donald R. Comuzzi; Christopher L. Makay

[57] ABSTRACT

An ice bagger comprises an ice maker, an ice bagging unit which includes an automatic sanitation system, and a merchandiser. The ice maker delivers particulate ice into a hopper housed within the ice bagging unit. The ice bagging unit includes a bag carrier which retrieves a bag from a bag supply and opens the bag underneath a delivery chute communicating with the hopper via an auger. A scale supports the bag during its filling to measure the weight of the ice delivered into the bag from the hopper. When the scale registers the desired amount of ice, the auger ceases to deliver ice from the hopper into the delivery chute. The ice bagging unit further includes a sealer arm and heating element wherein, after the bag is filled, the sealer arm pivots to detach the bag from the bag carrier and force both sides of the open end of the bag against the heating element. The heating element then activates to seal the bag closed. Once the bag has been closed, the scale pivots to deliver the sealed bag of ice into the merchandiser while the sealer arm raises to its original position. The above cycle then repeats to fill another bag with ice. Additionally, the ice bagger further comprises a sanitizing system which periodically activates to sanitize the hopper.

4 Claims, 15 Drawing Sheets

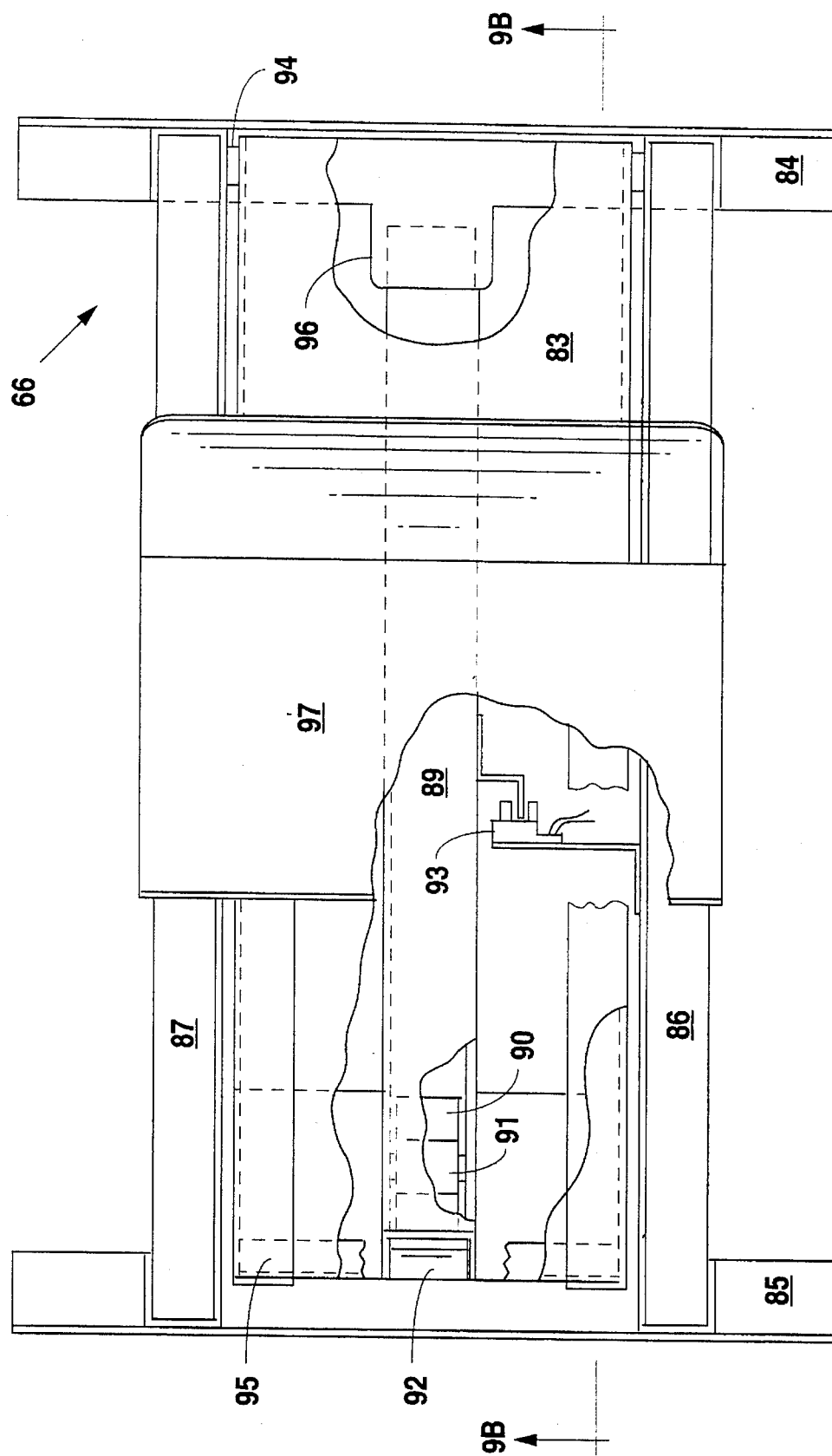

METHOD FOR AUTOMATICALLY BAGGING ICE USING A TIMER AND MULTIPOSITIONAL ELECTRONIC SCALE

CROSS REFERENCE TO RELATED APPLICATIONS

This application is a divisional application of application Ser. No. 08/145,434 filed on Oct. 29, 1993, now U.S. Pat. No. 5,498,851.

BACKGROUND OF THE INVENTION

1. Field of the Invention

The present invention relates to an apparatus for automatically bagging discrete units of ice produced by associated apparatus.

2. Description of the Related Art

Many people require particulate ice on a daily basis for the cooling of food and beverages. These people often satisfy their ice requirements by purchasing bagged ice from grocery stores, convenience stores, gas stations, etc. Presently, ice companies produce and bag the particulate ice in a separate location and then deliver the bagged ice to stores. When stores sell ice company produced particulate ice, their profit margins are nominal and, in some instances, only covers the cost of storing and refrigerating the ice. Typically, ice company produced particulate ice costs stores only slightly less than the actual resale price of that ice to the public. Thus, at present, stores sell ice more as a public service than as a profit oriented venture. Accordingly, any apparatus that fits in a store to make, bag, and deliver particulate ice to the public is highly desirable.

U.S. Pat. No. 4,368,608 issued to Ray embodies one such apparatus and discloses an ice bagger where an ice maker freezes and cubes a measured amount of water and then drops the cubes directly into a bag placed under a chute connected to the ice maker. Although the Ray apparatus automatically bags particulate ice, its freezing of the measured amount of water followed by the dropping of the cubes directly into the bag causes problems in its operation. Specifically, the freezing of the measured amount of water often results in a less than full harvest of ice which translates into the undesirable consequence of selling ice bags with less ice than the amount printed on the bag. Furthermore, by dropping the ice directly from the ice maker into the bag, unfrozen water enters the bag where it freezes the ice cubes together to form a solid block of ice instead of the desired particulate ice.

U.S. Pat. No. 5,109,651 issued on May 5, 1992, to Stuart discloses an ice bagger which improves over the Ray apparatus. The ice bagger disclosed in Stuart first delivers the ice made by an ice maker to a hopper before bagging. The hopper includes a drain so that any excess water drains from the ice before it is bagged. The Stuart apparatus includes an auger that transports the ice from the hopper to a chute which delivers the ice into a bag positioned below the chute. A bag conveyor sequentially grasps each individual bag from a bag supply and transports each bag to a position below the chute such that it rests on a spring scale. The auger delivers the ice from hopper and into the bag via the chute until the strain gauge registers the preselected weight of the ice within the bag. A sealer arm then pivots to seal the bag which is then dropped into a merchandiser.

Although the Stuart ice bagger improves over the Ray ice bagger, it also suffers from operational disadvantages. First, the spring scale often provides an inaccurate reading of the actual weight of the ice within the bag. As the ice drops into the bag, it bounces the scale housing which vibrates the spring resulting in inaccurate measurement of the weight of the ice within the bag. Also, both the cold and aging of the spring changes its elasticity which causes it to register different weights dependent upon its temperature and age. Furthermore, the spring has a tendency to stick resulting in the scale sensor tripping after the bag has already overflowed. When that occurs, the sealer arm jams the ice bagger causing the ice bagger to cease producing bagged ice. In addition, the ice within the machine melts to produce a mess which must be cleaned by store personnel.

Second, the scale housing includes doors which open to deposit the ice bags into the merchandiser at exactly the same place within the merchandiser during each delivery. It the ice bags were allowed to accumulate in the same place within the merchandiser, they would eventually stack up to jam the doors resulting in a system malfunction. Accordingly, the Stuart ice bagger requires store personnel to redistribute the bags within the merchandiser on a regular basis.

Finally, and, more importantly, the Stuart ice bagger fails to include an automatic sanitizing system for its hopper. Government regulations require the periodic sanitation of all hoppers used in stores to house non-bagged ice. Furthermore, these regulations require ice baggers which sell ice directly to the public to include automatic sanitation systems for their hoppers. Accordingly, the Stuart ice bagger is unsuitable for use in stores which sell ice directly to the public because it contains no automatic sanitizing system.

SUMMARY OF THE INVENTION

In accordance with the present invention, an ice bagger includes an ice maker, an ice bagging unit, and a merchandiser. The ice maker produces particulate ice and delivers the ice into a hopper housed within the ice bagging unit. The hopper stores the ice and communicates with an auger with delivers the ice from the hopper to a delivery chute. The ice bagging unit further includes a bag supply and a bag carrier which grasps a bag from the bag supply and opens the bag and holds it underneath the delivery chute. In addition, the ice bagging unit contains a sealer arm which works in tandem with a heating element to seal the bag after it is filled with ice.

Furthermore, a scale mounts underneath the ice bagging unit to support the bag during its filling and measure when the desired amount of ice has been delivered into the bag. The scale includes a scale housing which connects underneath the ice bagging unit using motor driven arms. A counterweight beam pivotally connected to one end of the scale housing and a pressure plate residing over the counterweight beam pivotally connected to the opposite end of the scale housing implement the scale mechanism. The scale further includes a sensor which trips when the scale registers the desired weight of the ice within the bag.

The scale which employs a balance beam configuration improves over spring operated strain gauges because the striking of the scale housing by the ice does not vibrate the counterweight beam resulting in inaccurate measurements, and the measurement tolerance of the counterweight beam is unaffected by the cold or the age of the counterweight beam. Additionally, the simplicity of the balance beam configuration ensures the scale sensor will trip before the bag overfills. That is, the pressure plate consistently pivots the counterweight beam to trip the sensor when the desired amount of ice fills the bag.

In operation, once the hopper fills with ice from the ice maker, the bag carrier retrieves a bag from the bag supply and holds it open underneath the chute. The auger then activates to deliver a small amount of ice into the bag. After the auger delivers a small amount of ice into the bottom of the bag, it deactivates and the motor driven arms which support the scale housing raise the scale housing until it supports the bag. Next, the auger reactivates to continue the delivery of ice into the bag from the hopper via the chute. As ice fills the bag, it exerts pressure against the pressure plate which, in turn, pivots the counterweight beam of the scale in an arc within the scale housing. When the ice within the bag reaches the desired weight, the pressure plate exerts sufficient force against the counterweight beam to pivot it so that the sensor trips resulting in the deactivation of the auger to stop the delivery of ice.

Furthermore, the triggering of the sensor activates the sealer arm which pivots to release the bag from the bag carrier and force the open edges of the bag against the heating element. The heating element then activates to heat seal the bag. After the bag is sealed, the sealer arm raises to its initial position and the bag support pivots to dump the bag of ice into the merchandiser. At this point, the bagging process begins again by the scale recentering under the chute and the bag carrier returning to the bag supply so that another bag may be opened underneath the chute.

The ice bagging unit still further includes a sanitizing system which removes old ice from the hopper and cleans the hopper with a sanitizing solution. The sanitizing system comprises a line which connects to a water source to deliver water into the hopper. A solenoid valve mounts to the line between the water source and the hopper to control the flow of water to the hopper. During periods when the ice bagging unit does not bag ice because the merchandiser is full, any ice left within the hopper needs to be removed to prevent it from freezing together to form ice chunks unsuitable for bagging. When that occurs, the solenoid activates to permit the line to spray water within the hopper to melt the ice and flush it from the hopper. The hopper includes an outlet for the sprayed water and melted ice and, more importantly, for melted ice produced during bagging operations to prevent that water from being bagged with the ice.

The sanitizing system further includes a pan which communicates with the outlet of the hopper to receive the melted ice and any water utilized to flush the ice from the hopper. The pan initially stores the melted ice and water and then delivers the melted ice and water to a drain under the control of a flow controller. Additionally, the sanitizing system comprises a first pump which communicates with a sanitizing agent source to deliver the sanitizing agent into the pan where it mixes with the water stored within the pan to form a sanitizing solution. A second pump also communicates with the pan to deliver the sanitizing solution from the pan into the hopper thereby cleaning it.

Thus, to sanitize the hopper, the solenoid valve for the line connected to the water source opens to allow the delivery of water into the hopper. The water enters the hopper and melts the ice and forces the melted ice through the hopper outlet and into the pan. When all the ice melts, the solenoid valve shuts off. During the sanitation of the hopper, the flow controller connected between the pan and the drain prevents the water from draining from the pan. After the water enters the pan, the first pump delivers the sanitizing agent into the pan to form the sanitizing solution. Next, the second pump pumps the sanitizing solution into the hopper where the solution cleans the hopper and then returns to the pan for recirculation.

Once the hopper has been sanitized, the flow controller allows the sanitizing solution to drain from the pan. However, after the sanitizing solution drains from the pan, the solenoid positioned in the line connected to the water source opens, and the flow controller prevents the water entering the pan from reaching the drain. After the pan refills with water, the solenoid valve shuts off, and the second pump then reactivates to circulate the water from the pan through the hopper to rinse any residual sanitizing solution form the hopper.

At the conclusion of the hopper rinse, the second pump deactivates, and the ice maker begins making and delivering ice into the hopper. Furthermore, the flow controller allows any water entering the pan to reach the drain. After the hopper fills with a first harvest of ice, the solenoid valve for the line connected to the water source again opens to allow the delivery of water into the hopper. The water enters the hopper and melts the ice and forces the melted ice through the hopper outlet and into the pan. The sanitation system performs this second flush of ice to ensure no sanitizing solution is bagged with the ice. When all the ice is melted, the solenoid valve shuts off, and the bagging unit returns to normal operation.

It is, therefore, an object of the present invention to provide an ice bagger which utilizes a balance beam scale to provide and accurate indication of the weight of the ice within a bag.

It is a further object of the present invention to provide an ice bagger with an automatic sanitizing system.

Still other objects, features, and advantages of the invention will become apparent to those skilled in the art in light of the following.

BRIEF DESCRIPTION OF THE DRAWINGS

FIG. 8 is a cut-out top elevation view depicting the scale mounted within the scale housing of the present invention.

DETAILED DESCRIPTION OF THE PREFERRED EMBODIMENTS

Figure 1:
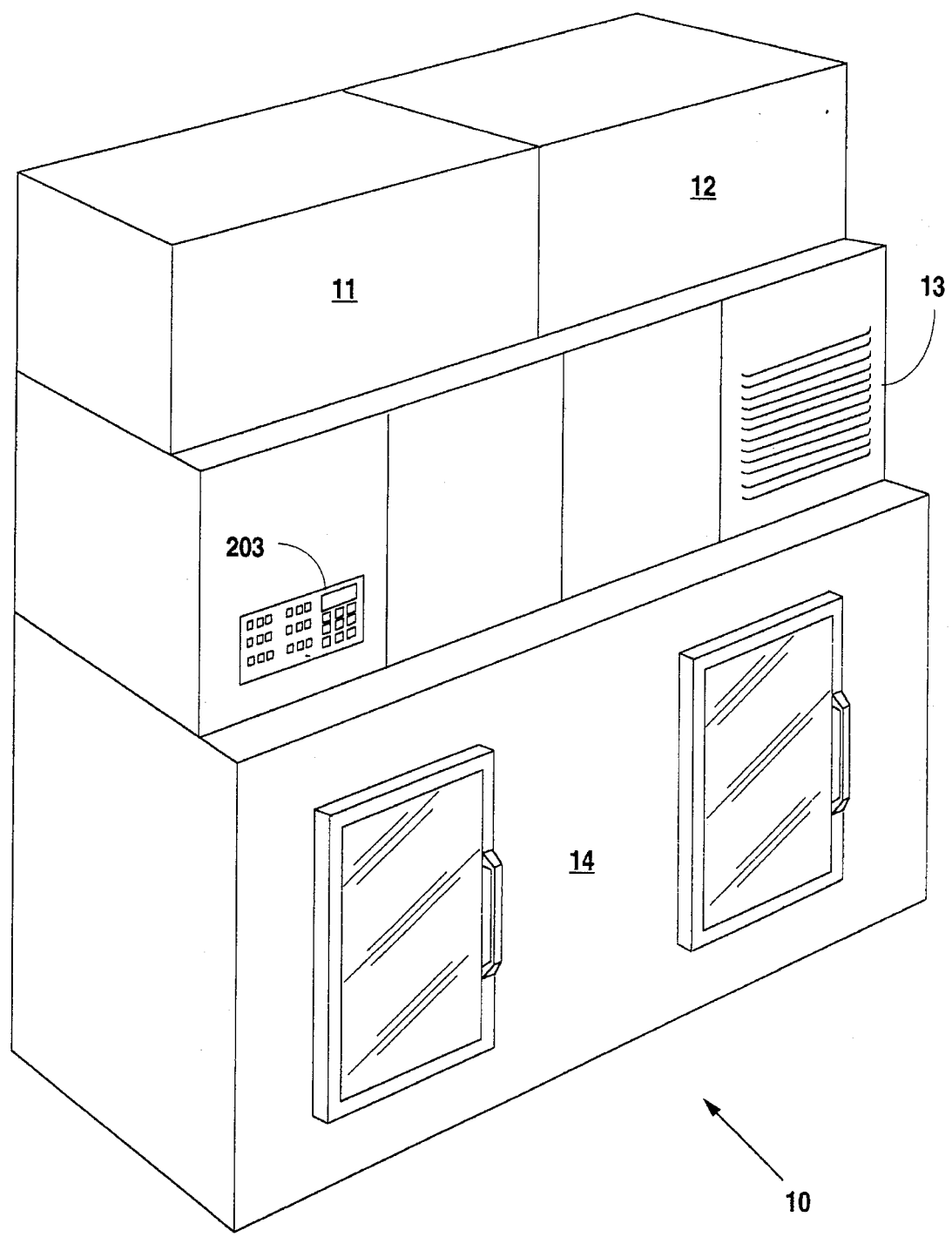
FIG. 1 is a perspective view depicting the housing of the ice bagger of the present invention.

As shown in FIG. 1, ice bagger 10 includes ice makers 11 and 12 which receive water from a water source such as a public water line and produce ice in particulate form (e.g., cube or crescent shape pieces having average dimensions from ½ to 2½ inches. Illustratively, ice makers 11 and 12 may be implemented utilizing a HOSHIZAKI KM 1200 manufactured by Hoshizaki America, Inc. and described in U.S. Pat. No. 4,368,608. Alternatively, ice making machines which produce chunk or crushed ice may be used to implement ice makers 11 and 12. Ice bagger 10 further includes ice bagging unit 13 which receives the ice from ice makers 11 and 12, transfers the ice into individual bags, seals those bags, and then delivers the ice bags into merchandiser 14 where consumers may retrieve them.

Figure 2:
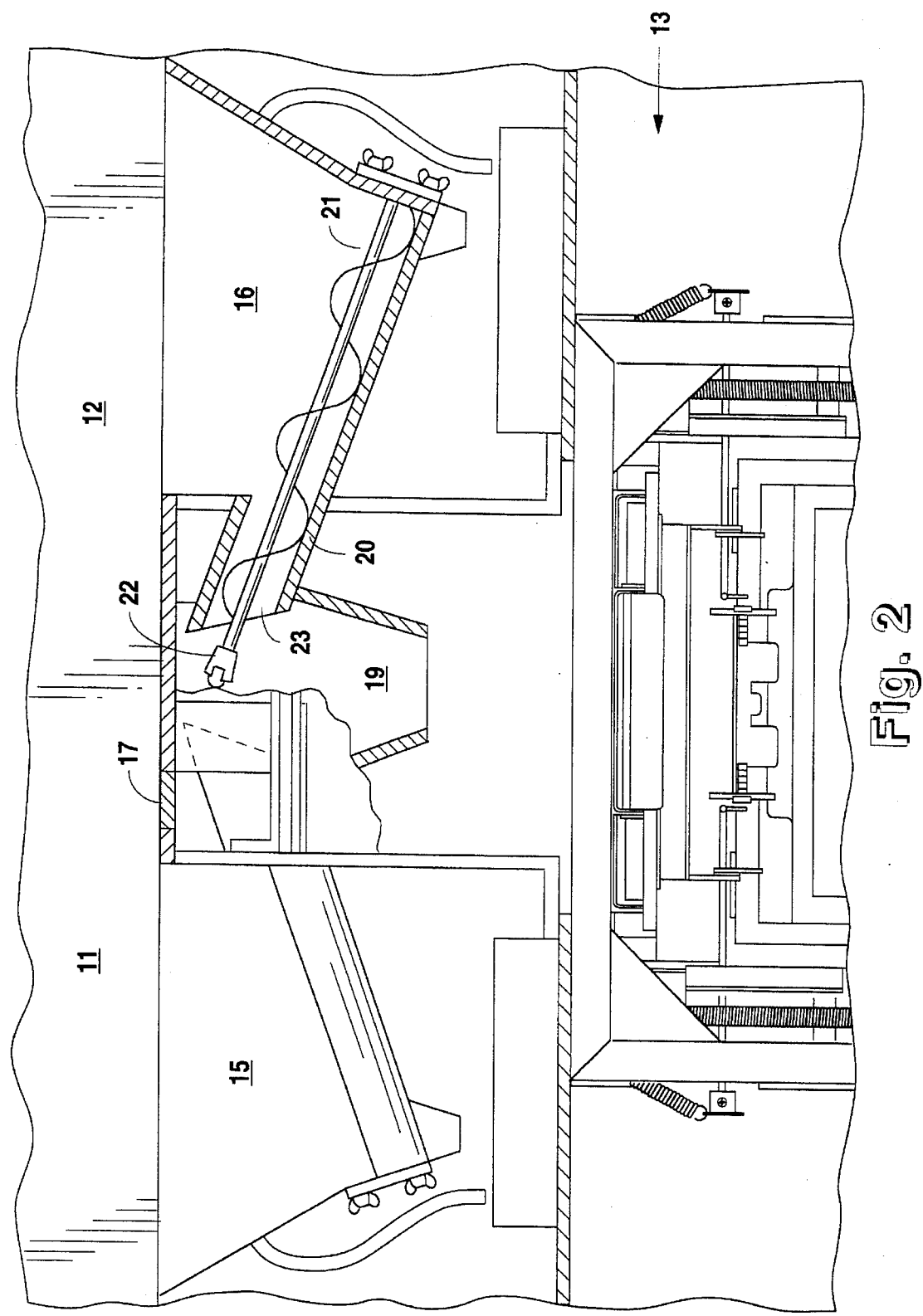
FIG. 2 is a front elevation view in partial cross-section depicting the hoppers and augers of the present invention.

As shown in FIG. 2, ice bagging unit 13 includes hopper 15 which communicates with the outlet for ice from ice maker 11 to provide a storage bin for the ice dispensed from ice maker 11. Similarly, hopper 16 communicates with the outlet for ice from ice maker 12 to provide a storage bin for the ice dispensed from ice maker 12. In the preferred embodiment, hoppers 15 and 16 are constructed of a plasticized material to prevent the ice from freezing to their inner walls. Hoppers 15 and 16 mount to frame 17 of ice bagging unit 13 using any suitable means such as screws.

Auger 18 resides within auger housing 20 and functions to deliver ice from hopper 16 to chute 19. Auger 18 connects at one end to motor 23 (see FIG. 12) and at its opposite end to frame 17 using universal joint 22. Auger housing 20 furnishes an enclosed path for the ice delivered from hopper 16 to chute 19 by auger 18. Auger housing 20 connects to hopper 16 over outlet 21 from hopper 16 and mounts to frame 17 using any suitable means such as welding.

To facilitate the delivery of ice from hopper 16 to chute 19, motor 23 drives auger 18 so that it pulls ice from hopper 16. As auger 18 continues to rotate, it forces the ice through auger housing 20 and out outlet 23 of auger housing 20 into chute 19. Chute 19 receives the ice and guides it into a open bag positioned below it. When the bag is full, motor 23 stops and then reverses auger 18 slightly to pull the ice within auger housing 20 back from auger housing outlet 23. Motor 23 reverses auger 18 to prevent ice from exiting auger housing 20 when no bag resides below chute 19. Without the reversal of auger 18, ice would fall from auger housing 20 into merchandiser 14 resulting in a mess which must be cleaned by store personnel.

Even though the auger mechanism connected to hopper 15 has not been described, it comprises the same components and functions identically to the auger mechanism connected to hopper 16. However, the auger of hopper 15 activates separately from auger 18 to deliver ice into chute 19 and fill a bag positioned below chute 19. That is, only one of hoppers 15 and 16 is utilized to deliver ice into a bag positioned below chute 19. Illustratively, auger motor 23 activates repeatedly to fill bags with ice until the ice within hopper 16 has been depleted. The auger motor of hopper 15 then activates repeatedly to fill bags with ice until hopper 15 has also been depleted. While the auger of hopper 15 delivers ice into the bags sequentially positioned below chute 19, ice maker 12 refills hopper 16 with ice. Similarly, ice maker 11 refills hopper 16 with ice, while auger 18 again delivers ice into the bags sequentially positioned below chute 19. Although the preferred embodiment discloses two ice makers and two hoppers, only one ice maker and hopper are actually required. However, any number of ice makers and hoppers may be employed to implement ice bagger 10.

Figures 5, 6:
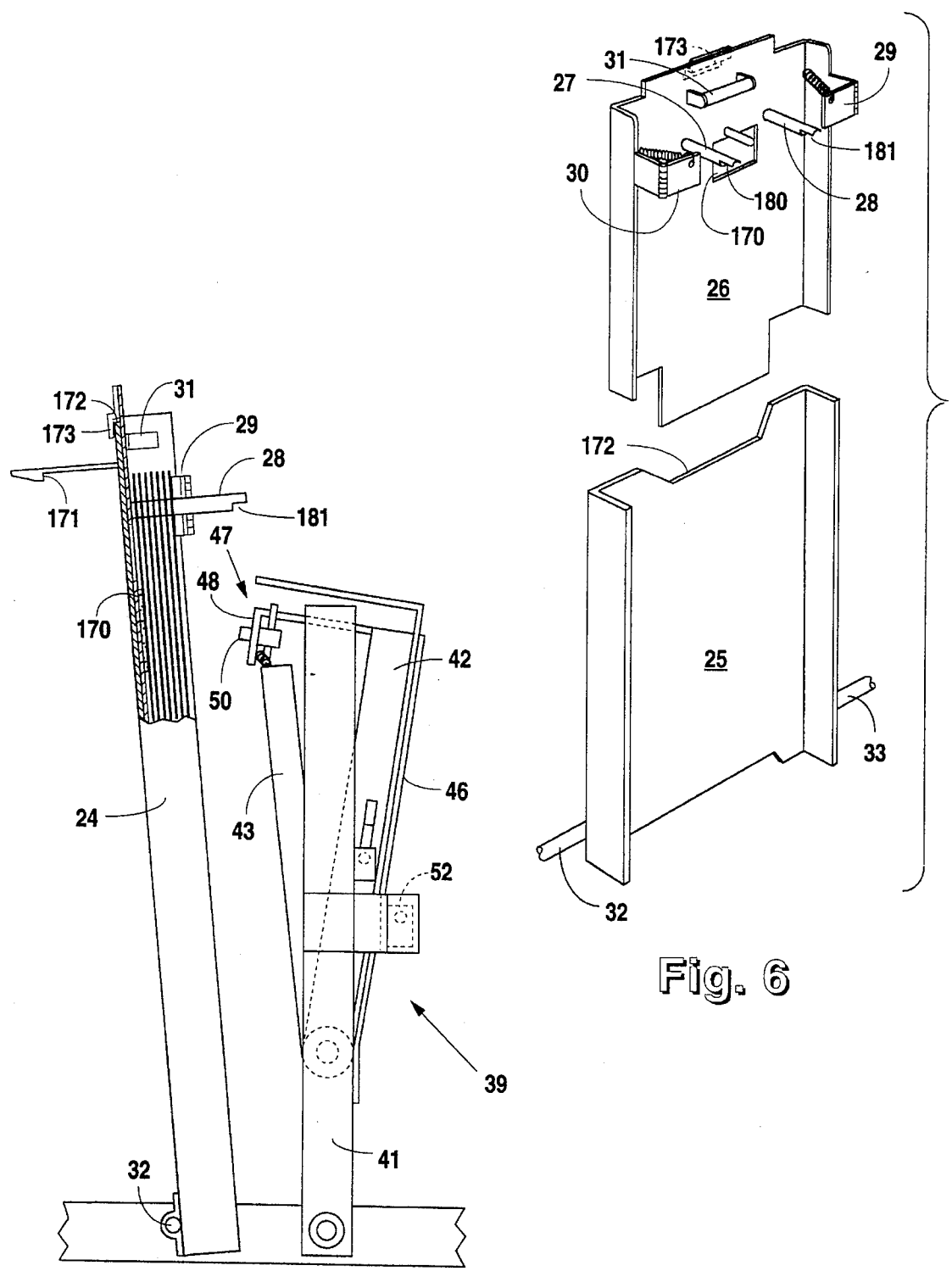
FIG. 5 is a cut-out side elevation view depicting the bag carrier and bag supply of the present invention.
FIG. 6 is a perspective view depicting the bag supply of the present invention.

As shown in FIGS. 3, 5, 6 and 10, ice bagging unit 13 includes bag supply 24. Referring to FIG. 6, bag supply 24 comprises cassette tray 25 which houses cassette 26. Cassette 26 includes pins 27 and 28 and arms 29 and 30 both of which secure the bags within cassette 26. Furthermore, cassette 26 includes pin 275 positioned off the center of cassette 26 to prevent the bags from being placed on cassette 26 backwards. The bags include a pair of eyelets at one end which fit over pins 27 and 28 to allow the suspension of the bags within cassette 26. The bags further include a third eyelet located off center which fits over pin 275. Thus, pin 275 prevents the bags from being positioned backwards within cassette 26 because the bags will fit over pin 275 only if placed correctly within cassette 26. Pins 27 and 28 include slots 180 and 181, respectively, which receive the guide arms (described herein) so that the eyelets of each bag easily transfer from pins 27 and 28 to the guide arms during each bag's removal. Additionally, arms 29 and 30 engage the edges of the bags to hold the bags suspended from pins 27 and 28.

Cassette 26 further includes pad 170 which mounts to cassette 26 using any suitable means such as glue to provide a surface which allows the bag carrier (described herein) to more easily grasp the individual bags. Handle 31 furnishes a grasping point to allow the easy installation and removal of cassette 26 from cassette tray 25. Additionally, cassette 26 includes hook 173 (see FIGS. 3 and 10) which fits within slot 172 of cassette tray 25 and engages cassette tray 25 to arrest the movement of cassette 26 within cassette tray 25.

Figure 10:
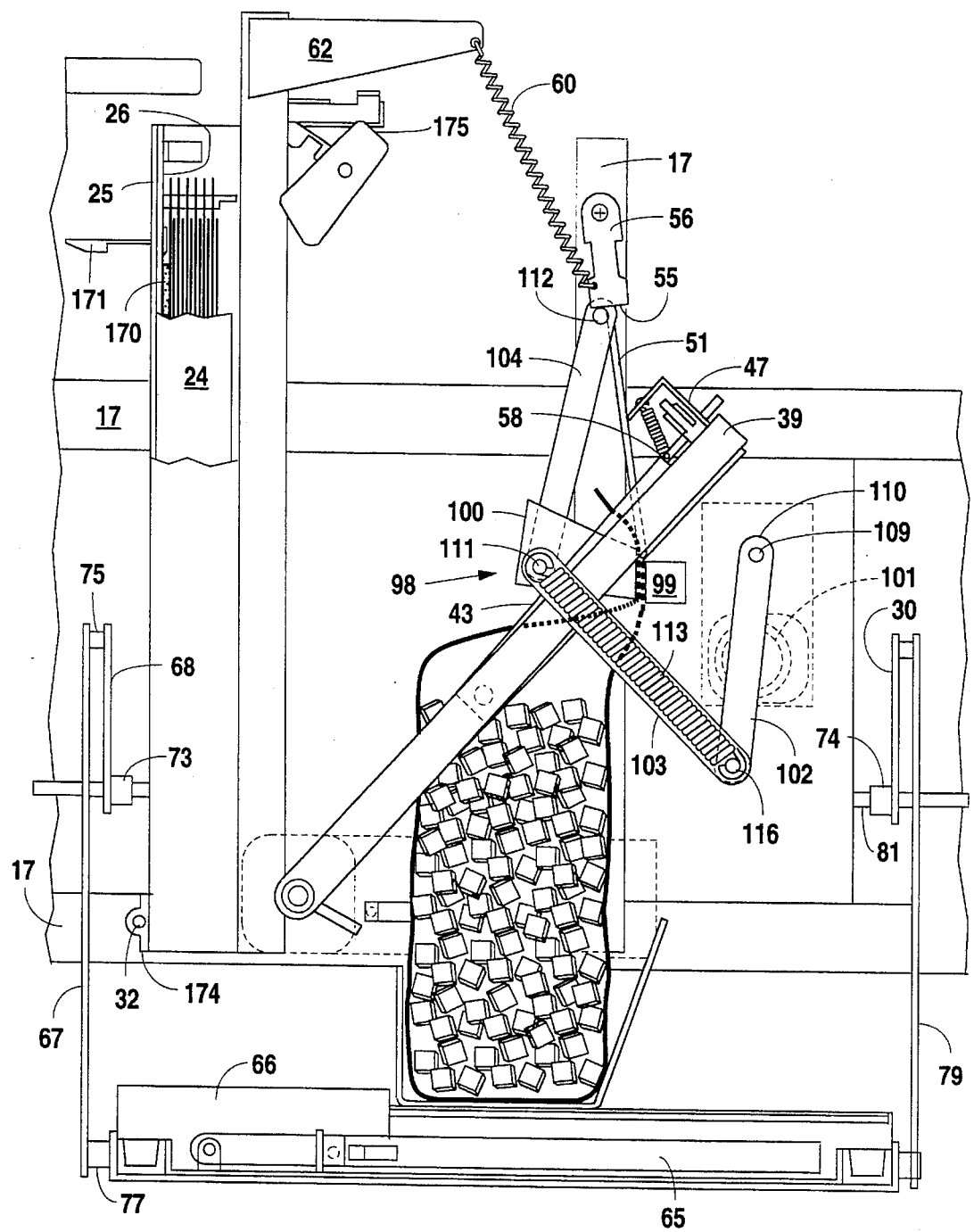
FIG. 10 is a cut-out side elevation view depicting the bag sealer of the present invention.

Cassette tray 25 pivotally mounts to frame 17 of ice bagging unit 13 using pins 32 and 33 which fit within brackets mounted to frame 17 (see FIG. 10). To facilitate the easy loading of bag supply 24 with bags, pins 32 and 33 and their brackets connected to frame 17 permit cassette tray 25 to pivot from the vertical position shown in FIG. 10 to an open position transverse to its closed vertical position. Additionally, cassette tray 25 includes handle 171 (see FIGS. 3 and 10) which supplies a grasping point used in the raising and lowering of cassette tray 25. Cassette 26 slides easily from cassette tray 25 so that it may easily be stocked with bags. Cassette 26 is then slid back within cassette tray 25 where hook 173 prevents cassette 26 from dislodging from cassette tray 25. Cassette tray 25 is then pivoted back to the position shown in FIG. 10 where latch 34 (see FIG. 4) latches cassette tray 25 into place.

Figure 4:
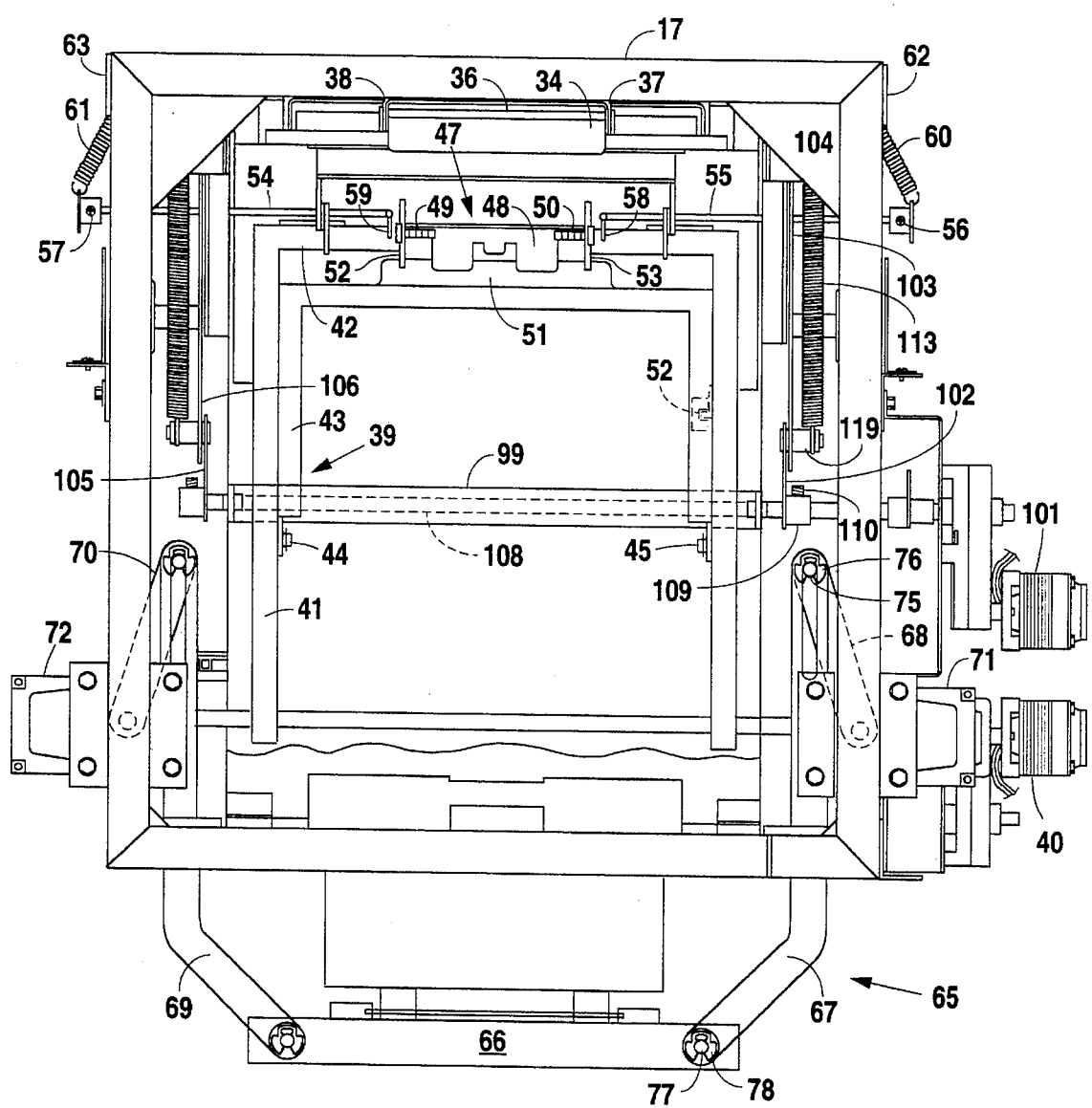
FIG. 4 is a front elevation view depicting the bag carrier, bag sealer, and scale of the present invention.

As shown in FIG. 4, latch 34 connects to frame 17 using pin 36 and brackets 37 and 38 which connect to frame 17 using any suitable means such as welding. Latch 34 not only functions to latch cassette tray 25 when cassette 26 is installed, but it also latches cassette tray 25 with cassette 26 removed. Cassette tray 25 is latched during the stocking of cassette 26 to prevent store customers from colliding with cassette tray 25, possibly causing injury.

Referring to FIGS. 3, 4, 5, and 10, ice bagging unit 13 includes bag carrier 39 which grasps a bag from bag supply 24 and carries the grasped bag under chute 19. Bag carrier 39 comprises motor 40 which drives carrier arm 41 in an arc. Carrier arm 41 furnishes the frame which supports gripper arm 42 and gripper reset arm 43. Gripper reset arm 43 connects to carrier arm 41 using pins 44 and 45 and freely pivots within carrier arm 41. Gripper arm 42 also connects to carrier arm 41 at pins 44 and 45, however, flat spring 46 connects to both carrier arm 41 and gripper arm 42 to provide a substantially rigid support of gripper arm 42 within carrier arm 41. Gripper arm 42 includes gripper 47 which comprises mounting plate 48 and spring loaded hooks 49 and 50. Additionally, gripper reset arm 43 includes flange 51 which residues in front of pins 52 and 53 of spring loaded hooks 49 and 50 to allow the resetting of spring loaded hooks 49 and 50 during the sealing of the bag (described herein).

Thus, to grasp and open a bag, motor 40 drives carrier arm 41 in an arc towards bag supply 24 to place mounting place 48 against the top bag. As carrier arm 41 continues to travel forward, spring loaded hooks 49 and 50 trip to pinch the front of the bag against mounting plate 48. Flat spring 46 provides sufficient tension against gripper arm 42 to permit the tripping of spring loaded hooks 49 and 50, however, after spring loaded hooks 49 and 50 trip, flat spring 46 allows a slight rearward motion of gripper arm 42 as carrier arm 41 continues in its forward arc. The rearward pivoting of gripper arm 42 trips sensor 52 which causes motor 40 to reverse resulting in carrier arm 41 reversing its direction of travel. That reversal in direction of carrier arm 41 allows gripper 47 to pull the front of the bag open.

As carrier arm 41 continues to arc away from bag supply 24, it pulls the rear of the bag off pins 27 and 28 of bag supply 24 onto guide arms 54 and 55. Guide arm 55 comprises bracket 56 which pivotally connects to frame 17, pin 58 mounted to bracket 56, and spring 60 which connects between bracket 56 and bracket 62 of frame 17. Similarly, guide arm 54 comprises bracket 57 which pivotally connects to frame 17, pin 55 mounted to bracket 56, and spring 61 which connects between bracket 57 and bracket 63 of frame 17. Guide arms 54 and 55 receive the two eyelets formed at the top rear of the bag to assist bag carrier 39 in supporting the bag under chute 19.

In addition to guide arms 54 and 55, bag opener 175 connects to frame 17 between guide arms 54 and 55 to assist in opening the bag. During the rearward movement of carrier arm 41, the rear of the bag contacts bag opener 175 which ensures the rear of the bag separates from the front of the bag to open underneath chute 19. After carrier arm 41 has pulled the bag past bag opener 175 and onto guide arms 54 and 55, it will continue rearward until it pivots to the position shown in FIG. 10. Once carrier arm 41 reaches that position, it trips sensor 64 which results in motor 40 being disengaged. With motor 40 disengaged, the grasped bag resides below chute 19 in a totally open position because its rear portion has been suspended from guide arms 54 and 55 and its front portion is grasped by gripper 47 (see FIGS. 7A–C).

As shown in FIGS. 3, 4, 7A–C, 8, 9A and B, and 10, ice bagging unit 13 includes scale 65 which comprises a balance beam scale utilized to register when the desired amount of ice has been delivered into the bag. Scale 65 further furnishes the platform on which the bag rests during its filling with ice (see FIGS. 7A–C). Scale 65 includes scale housing 66 which is rectangular in shape (see FIG. 8) and supported at each one of its corners in a position under chute 19 within merchandiser 14 by motor driven arms. Specifically, arms 67 and 68 support one end of scale housing 66 while arms 79 and 80 support the same side of scale housing 66 as arms 67 and 68 but on the opposite end (see FIG. 10). Similarly, arms 69 and 70 support the end of scale housing 66 across from arms 67 and 68 while a fourth set of arms (not shown) support the same side of scale housing 66 as arms 69 and 70 but on the opposite end.

Scale 65 further includes motor 71 which drives arms 67, 68, 79, and 80 and motor 72 which drives arms 69 and 70 and their corresponding arms (not shown) connected at the corner on the same side of scale housing 66 as arm 69 and 70. Motor 71 mounts onto frame 17 and connects to drive shaft 81 to raise and lower arms 67, 68, 79, and 80. Drive shaft 81 functions to transfer the driving force of motor 71 to arms 68 and 80. Arms 68 and 80 include sleeves 73 and 74, respectively, which slide over drive shaft 81 and rigidly connect to drive shaft 81 using any suitable means such as a screw or allen nut (see FIG. 10). The opposite end of arm 68 pivotally connects to one end of arm 67 utilizing pin 75 and clip 76. Additionally, the opposite end of arm 67 connects to scale housing 66 using pin 77 and clip 78. Arm 79 connects to arm 80 which, in turn, connects to scale housing 66 using similar pins and clips. Although the connection among motor 72, the drive shaft for motor 72, arms 69 and 70, and the fourth set of arms which support scale housing 66 are not described, their connections are identical to that described for motor 71, drive shaft 81, and arms 67, 68, 79, and 80.

Figure 9A:
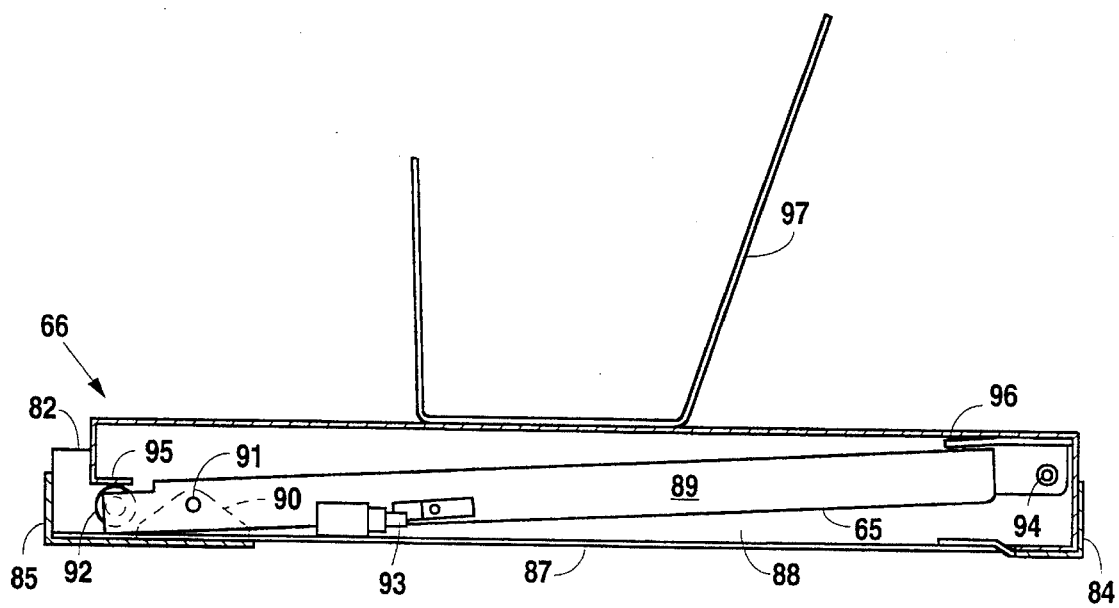
FIGS. 9A and 9B are cut-out side elevation views depicting the scale mounted within the scale housing of the present invention.
Figure 9B:
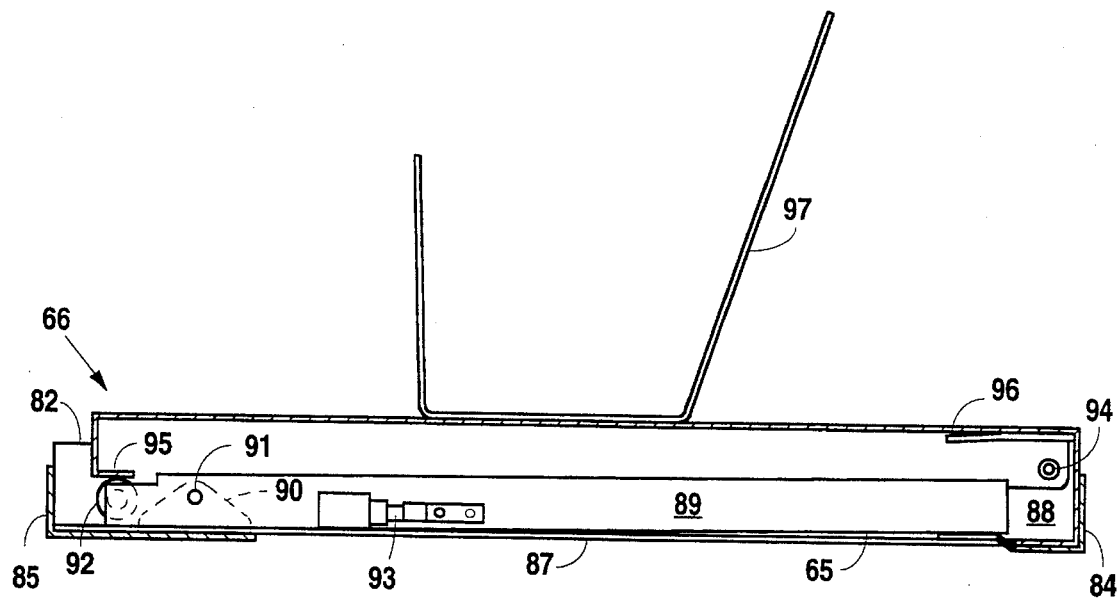

As shown in FIGS. 8, 9A, and 9B, scale housing 66 includes base 82 and pressure plate 83 which operates as part of scale 65. Base 82 comprises members 84–87 which connect together using any suitable means such as welding to define opening 88. Scale 65 comprises counterweight beam 89 which pivotally mounts within opening 88 through its connection to member 85 using bracket 90 and pin 91. Scale 65 further comprises roller 92 and sensor 93. Sensor 93 comprises a photo-optic sensor that trips in response to the pivoting of counterweight beam 89 within base 82. Pressure plate 83 pivotally mounts over counterweight beam 89 of scale 65 through its connection between members 86 and 87 using pin 94. Pressure plate 83 includes lip 95 which transfers the pivotal motion of pressure plate 83 to counterweight beam 89 and flange 96 which stops the pivotal motion of counterweight beam 89 within base 82. Bucket 97 mounts onto pressure plate 83 using any suitable means such as welding to maintain the bag positioned on scale housing 66 during its filling with ice.

Figure 7A:
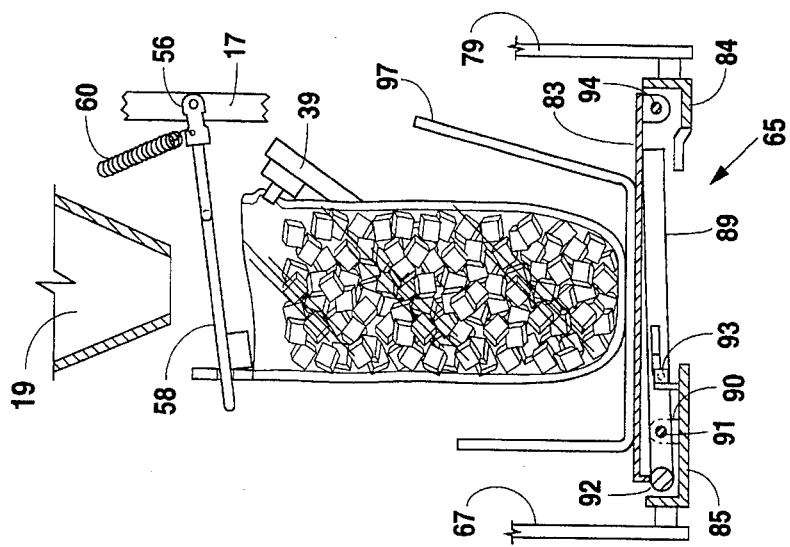
FIG. 7A–7C are cut-out elevation views depicting the positioning of the scale during the filling of the bag with particulate ice.
Figure 7B:
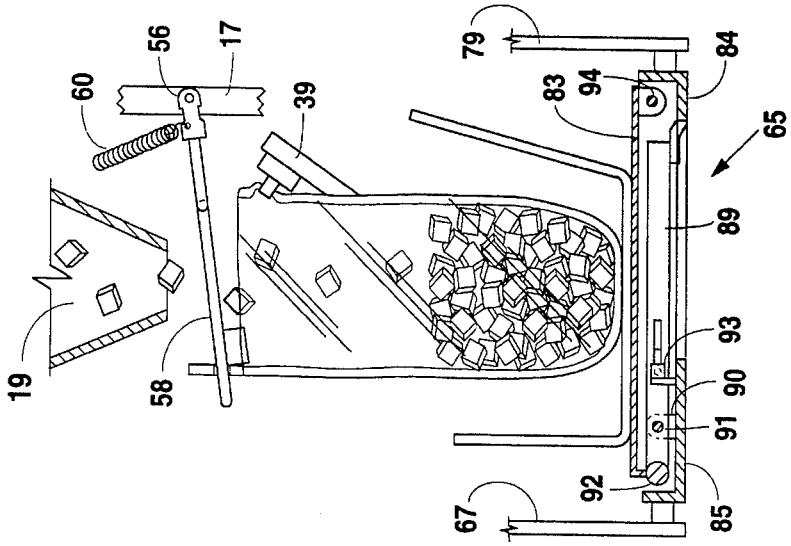
Figure 7C:
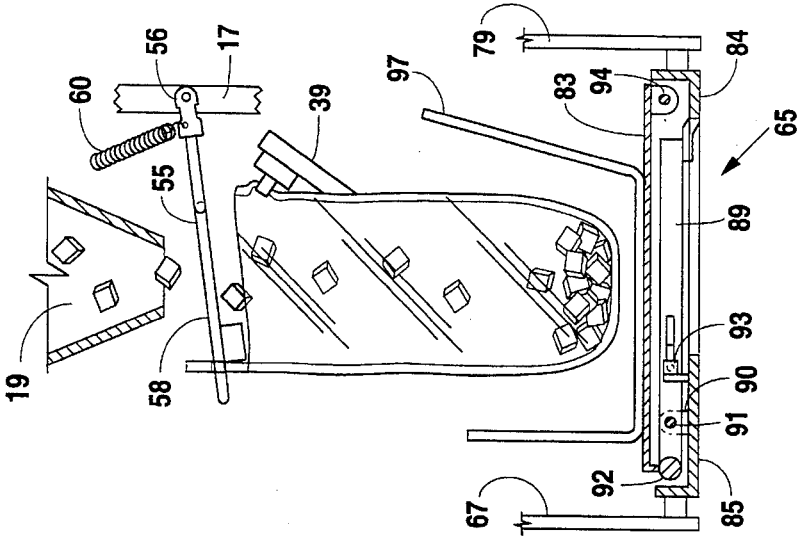

Referring to FIGS. 7A–C, the filling of a bag with particulate ice and the operation of scale 65 will be described. During periods when ice bagger 10 remains idle, motors 71 and 72 manipulate arms 67, 68, 79, 80, 69, 70, and the fourth pair to raise scale housing 66 to its fully raised position (see FIGS. 3, 4 and 10). However, when ice bagger 10 activates, motors 71 and 72 lower scale housing 66 to its fully lowered position so that ice bagging operations may begin. After bag carrier 39 grasps one side of a bag and pulls the bag from bag supply 24 onto guide arms 54 and 55, one of the auger motors activates to drive its auger so that ice from one of hoppers 15 and 16 will be delivered into the bag via chute 19. The auger operates until a sufficient amount of ice resides within the bag to trip a sensor positioned adjacent to each of guide arms 54 and 55. That is, as the ice enters the bag, it weights the bag which results in guide arms 54 and 55 rotating slightly downward to trip the sensors. After the sensors trip, the auger motor deactivates so that the auger only delivers a small amount of particulate ice (e.g. 5–10 particles) into the bottom of the bag (see FIG. 7A). The auger dumps a small amount of ice into the bottom of the bag to ensure the bag contains no wrinkles or folds and is thus fully open.

Motors 71 and 72 then actuate for a predetermined period (20 seconds in the preferred embodiment) to manipulate arms 67, 68, 79, 80, 69, 70, and the fourth pair to raise scale housing 66 to an intermediate position which supports the bag (see FIG. 7B). The same auger motor again activates to it auger so that ice from one of hoppers 15 and 16 will be delivered into the bag via chute 19. The auger operates for a second predetermined time period (25 seconds in the preferred embodiment) to partially fill the bag with particulate ice (see FIG. 7B).

Figure 3:
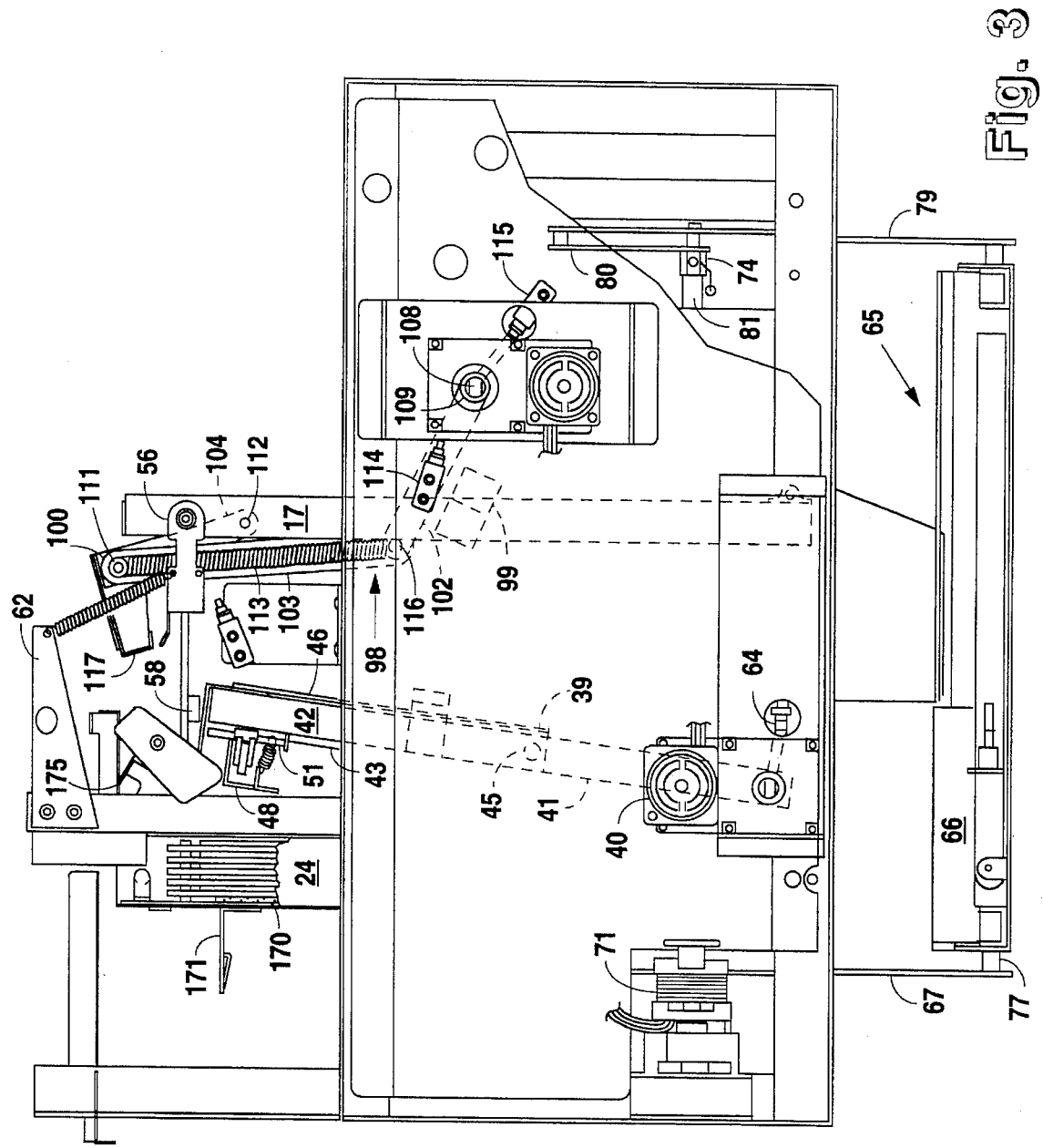
FIG. 3 is a side elevation view depicting the bag carrier, bag sealer, and scale of the present invention.

After the auger motor deactivates, motors 71 and 72 reactivate to manipulate arms 67, 68, 79, 80, 69, 70, and the fourth pair to raise scale housing 66 until those arms reach their fully raised position as shown in FIGS. 3, 4, and 10. Once scale housing 66 reaches its fully raised position, motors 71 and 72 deactivate and the same auger motor reactivates to continue the delivery of ice into the bag. The auger delivers ice from it respective hopper 15 or 16 into the bag via chute 19 until scale 65 registers the desired weight of the ice within the bag whereupon the auger motor disengages to discontinue the flow of ice into the bag (see FIG. 7C). The auger motor then reverses to drive the auger in reverse, resulting in the auger pulling the ice away from the auger housing outlet. The auger pulls the ice away from the auger housing outlet to ensure that no ice falls into merchandiser 14 after the bag has been sealed and delivered into merchandiser 14.

As shown in FIG. 9B, when no weight resides on pressure plate 83 counterweight beam 89 resides approximately parallel to the bottom of base 82. However, after motors 71 and 72 of scale 65 raise scale housing 66 such that the bag resides within bucket 97, scale 65 begins to register the weight of the ice within the bag. Illustratively, as the particulate ice collects within the bag (see FIG. 7C), the weight of the ice pivots pressure plate 83 about pin 94 to bring lip 95 on top of roller 92. As the ice continues to fill the bag, pressure plate 83 pivots further onto roller 92 resulting in the end of counterweight beam 89 containing roller 92 pivoting towards the bottom of base 82 while the opposite end of counterweight beam 89 pivots towards flange 96 of pressure plate 83. When the amount of ice within the bag corresponds to the desired bag weight as measured by scale 65, pressure plate 83 will have transferred the weight of the ice fully onto roller 92 causing counterweight beam 89 to pivot fully against flange 96 as shown in FIG. 9A. In its fully pivoted position, counterweight beam 89 trips sensor 93 which develops a signal representing a full bag of ice. In response to that signal, the activated auger motor turns off to stop the delivery of ice from its respective hopper 15 or 16 into the bag of ice. Scale 65 typically is adjusted to measure common weights for ice bags (e.g., 8 or 20 lb. bags), however, the substitution of a counterweight beam having a different overall weight for counterweight beam 89 will allow virtually any weight ice bag to be filled.

As shown in FIGS. 3, 4, and 9, bag sealer 98 includes heating element 99 which connects to frame 17 using any suitable means such as brace welded to frame 17. Additionally, heating element 99 connects to the brace using any suitable means such as brackets. Heating element 99 comprises a resistive heater that transfers heat to the front and back of the bag resulting in the front and back melting together to form a seal. Bag sealer 98 further includes motor 101 which drives press 100 via arms 102–104 connected to one side of press 100 and arms 105–107 connected to the opposite side of press 100. Motor 101 drives arms 102–107 through its connection to drive shaft 108 which mounts to frame 17 using any suitable means such as bearings. Drive shaft 108 functions to transfer the rotational force of motor 101 to arms 102–107.

Arm 102 includes sleeve 109 which fits over drive shaft 108 and rigidly connects to drive shaft 108 via screw 110. Pin 116 connects arms 102 and 103 together while pin 111 connects arms 103 and 104 together. Finally, pin 112 connects arm 104 to frame 17 to provide complete support for one side of press 100. Spring 113 connects between pins 110 and 111 to provide a restoring force against the movement of press 100 by arms 102–107. Although arms 105–107 have not been described, there connections to drive shaft 108 and frame 17 and among themselves are identical to that described for arms 102–104. Bag sealer 98 also includes sensors 114 and 115 which determine the maximum arc that press 100 swings during the sealing of the bag.

During the filling of the bag with particulate ice, press 100 resides in the position shown in FIG. 3. However, once the bag fills with ice, motor 101 activates to drive arms 102–107 pivotally so that they pull press 100 against heating element 99 as shown in FIG. 10. Essentially, arms 102–107 swing press 100 in an arc until it abuts heating element 99. As press 100 transverses its arc, its lower plate swings down and contacts the ends of guide arms 54 and 55 to force guide arms 54 and 55 downward to the position shown in FIG. 10, resulting in the bag sliding from guide arms 54 and 55.

Furthermore, the rotation of press 100 results in the disengaging of the bag from gripper 47. That is, during the swing of press 100, it exerts pressure against gripper reset arm 43 to pivot gripper reset arm 43 toward the rear of carrier arm 41. As gripper reset arm 43 pivots toward the rear of carrier arm 41, flange 51 of gripper reset arm 43 forces pins 52 and 53 rearward with sufficient force to overcome the restoring force of the springs of spring loaded hooks 49 and 50. Consequently, spring loaded hooks 49 and 50 reset to their open position so that the next bag to be filled may be grasped.

As press 100 arcs towards heating element 99, it pushes the front and rear sides of the bag against heating element 99. When press 100 abuts heating element 99 as shown in FIG. 10, sensor 115 trips to deactivate motor 101 thereby stopping the swing of press 100. At this point, the front and rear sides of the bag are pressed against one another between press 100 and heating element 99. Heating element 99 then activates for a predetermined time period (0.86 seconds in the preferred embodiment) resulting in the front and rear sides of the bag being heat sealed together to prevent the particulate ice from escaping the bag the length of time heating element 99 applies heat to the bag is a user set variable and is described herein with reference to FIG. 16.

After heating element 99 deactivates, motor 101 reverses to swing press 100 back to the position shown in FIG. 3. Motor 101 manipulates arms 102–107 to swing press 100 rearward until sensor 114 trips to indicate that press 100 has returned to its up position. Motor 101 then disengages to stop the motor of press 100. Additionally, as press 100 releases the pressure it applies against guide arms 54 and 55, the restoring force of springs 61 and 60 return guide arms 54 and 55 back to their horizontal position. That is, guide arms 54 and 55 pivot back until they reside within slots 180 and 181 of pins 27 and 28 of cassette 26. With press 100 fully withdrawn and the bag sealed, ice bagging unit 13 then delivers the bag of ice into merchandiser 14.

Figure 11:
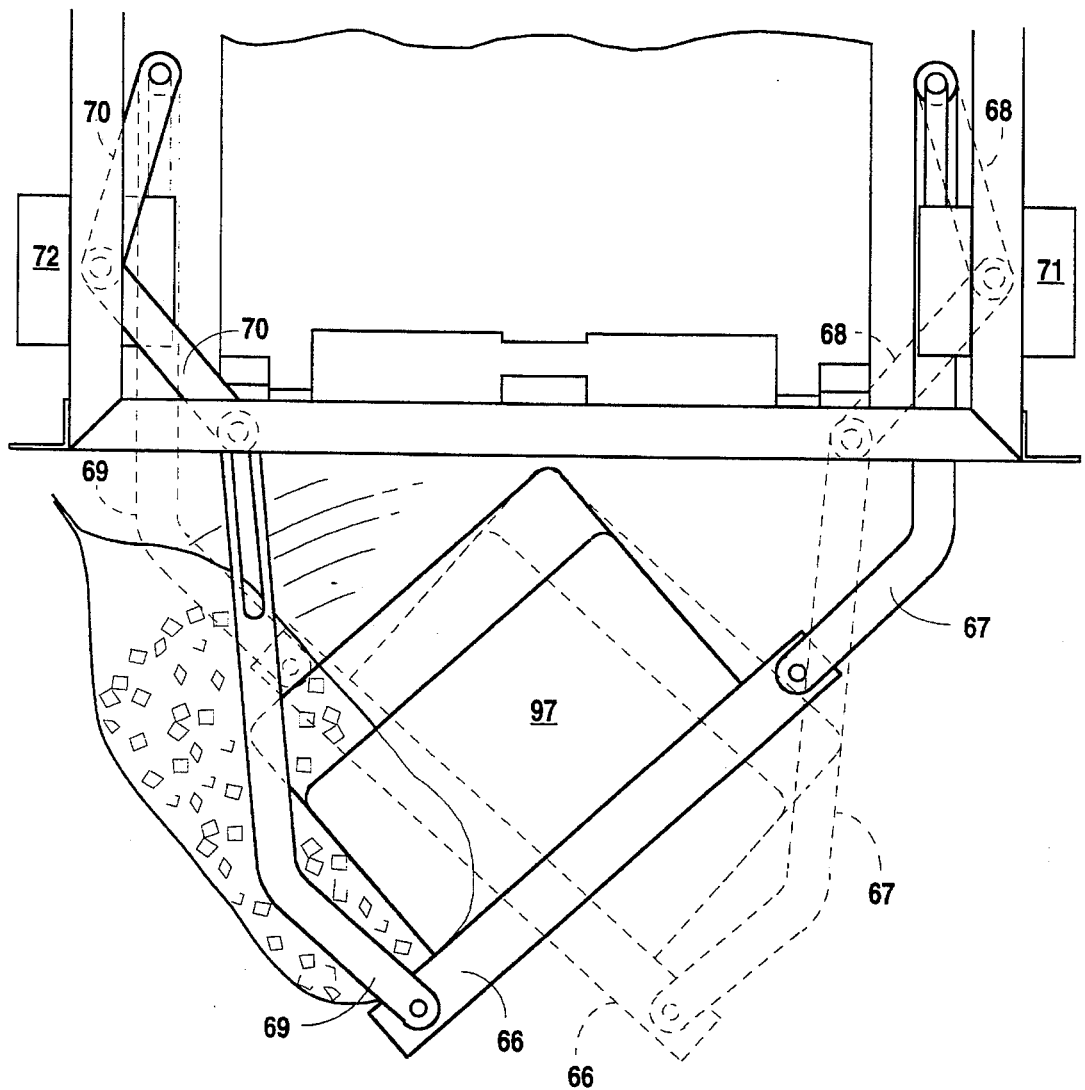
FIG. 11 is a cut-out front elevation view depicting the delivery of the bag of ice into the merchandiser by the sale of the present invention.

Referring to FIG. 11, the dumping of filled bags of ice alternately between the left and right side of merchandiser 14 to prevent the undesirable stacking of ice bags directly underneath scale housing 66 will be described. To accurately measure the amount of ice within each bag, scale housing 66 must reside in its fully raised position as previously described with reference to FIGS. 7A–C. To raise scale housing 66 during the filling of a bag with ice, motors 71 and 72 operate in tandem, however, to deliver a filled bag of ice into merchandiser 14, one of motors 71 and 72 energizes separately to drop one side of scale housing 66 so that the bag of ice will fall either into the left or right side of merchandiser 14.

Illustratively, motor 72 could be energized to drive arm 70 and its corresponding arm connected on the same side of scale housing 66 to the position shown in full in FIG. 11. As a result, arm 69 and its counterpart arm connected to the same side of scale housing 66 tilt scale housing 66 to the left resulting in the bag falling from bucket 97 into merchandiser 14. Alternatively, motor 71 could energize while motor 72 remains off to drive arms 68 and 80 to the position shown in outline in FIG. 10, resulting in arms 67 and 79 lowering the right side of scale housing 66 to dump the bag into the right side of merchandiser 14. During automatic operation, motors 71 and 72 alternately energize and deenergize to regulate the dumping of the ice into merchandiser 14 such that the ice bags are delivered alternately between the left and right side of the merchandiser 14.

After the ice bag has been dumped into merchandiser 14, scale housing 66 must be repositioned horizontally underneath chute 19. If ice bagging operations are to continue, the motor initially energized to perform the dumping remains deenergized, while the motor not energized activates to lower the end of scale housing 66 which remained in its fully raised position. Scale housing 66 must be lowered so that bag carrier 39 can retrieve another bag from bag supply 24 for filling. However, if bagging operations are to cease, scale housing 66 must be fully raised within ice bagging unit 13 so that it no longer extends into merchandiser 14. In this instance, the motor initially energized to perform the dumping is reenergized while the motor not originally energized remains unactivated resulting in scale housing 66 rising to the position shown in FIGS. 3, 4, and 10.

Figure 12:
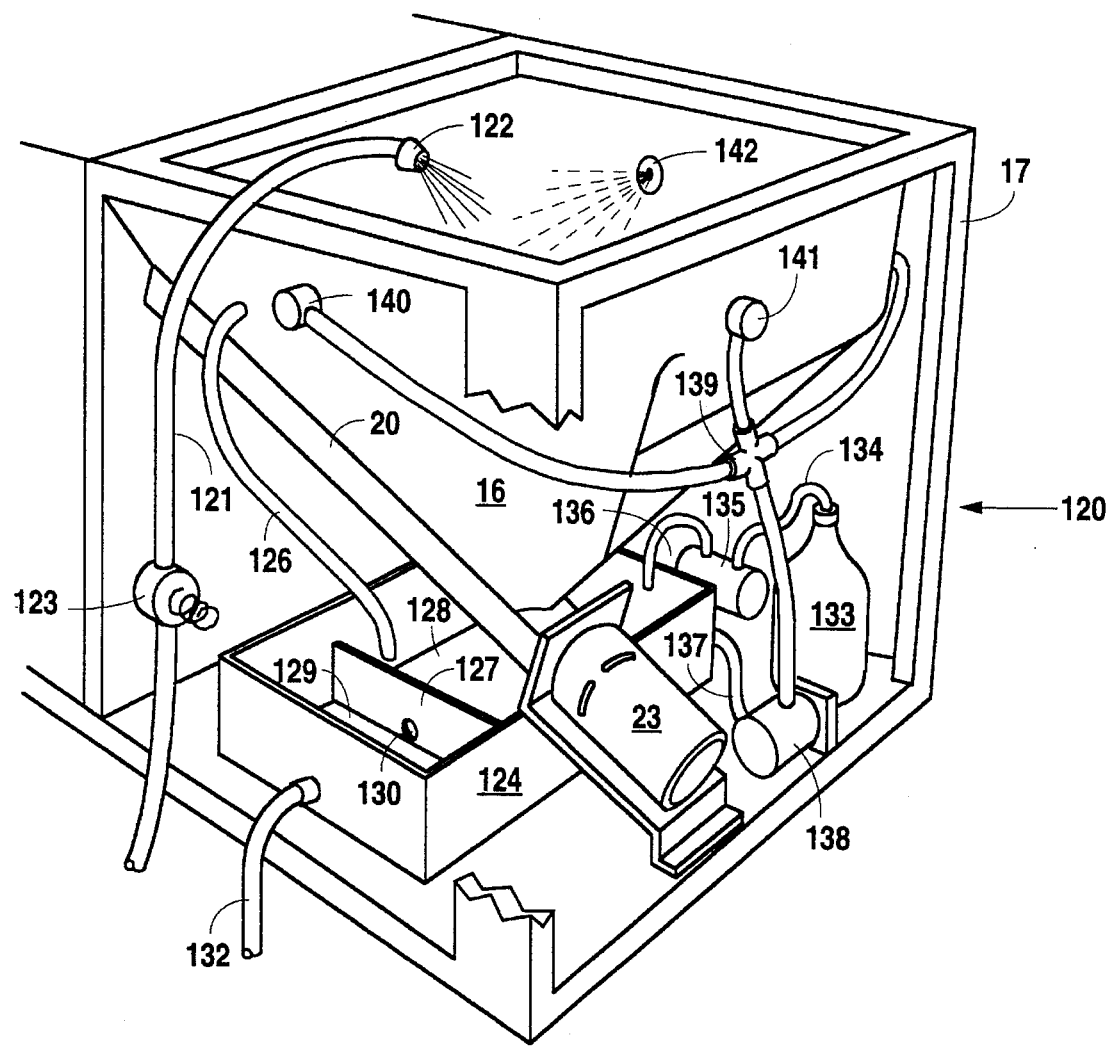
FIG. 12 is a cut-out perspective view depicting a first embodiment of the sanitizing system of the present invention.
Figure 13:
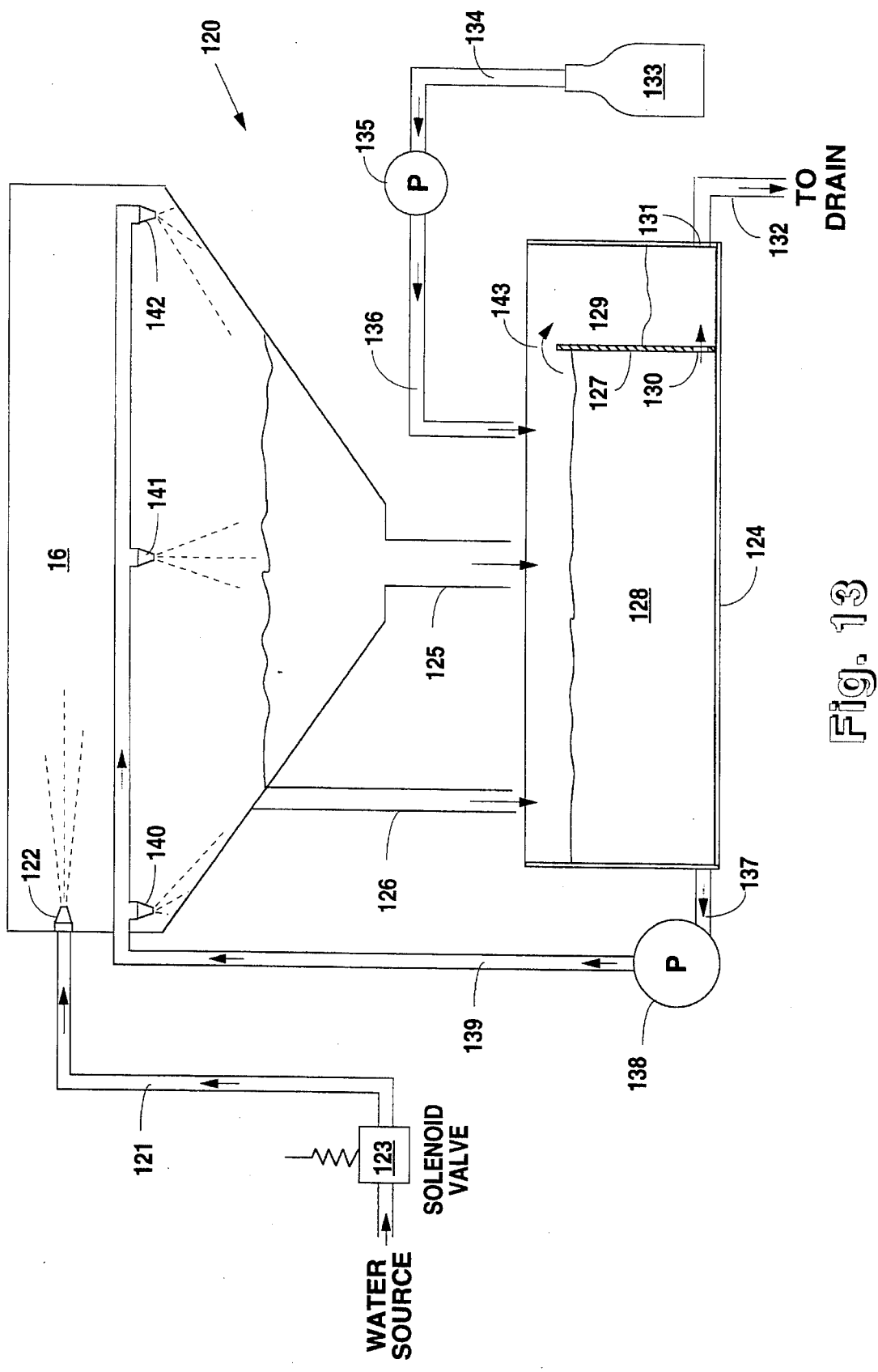
FIG. 13 is a schematic diagram depicting the first embodiment of the sanitizing system of the present invention.

As shown in FIGS. 12 and 13, the first embodiment of sanitizing system 120 includes line 121. Line 121 connects at its inlet to a water source such as a public water line and at its outlet with hopper 16. The outlet from line 121 communicates with the interior of hopper 16 through an opening in hopper 16 and secures to hopper 16 using any suitable means such as a bracket. Further, nozzle 122 connects to the outlet from line 121 to provide a water spray within hopper 16 while solenoid valve 123 residues within line 121 to control the flow of water from the water source to hopper 16.

Sanitizing system 120 further includes pan 124 which receives water from hopper 16 via outlet 125 and overflow 126 both of which communicate with the interior of hopper 16. Pan 124 includes baffle 127 which partitions pan 124 into reservoir 128 and drain channel 129. Reservoir 128 receives water from hopper 16 via outlet 125 and overflow 126 and pools that water for use in sanitizing hopper 16. Baffle 127 includes hole 130 which facilitates the flow of water from reservoir 128 to drain channel 129. Drain channel 129 includes outlet 131 which connects to a drain (not shown) to provide an exit for the water entering drain channel 129 from reservoir 128 to prevent reservoir 128 from overflowing. Additionally, the top of baffle 127 terminates short of the top of pan 124 to form spillway 143. Spillway 143 ensures pan 124 does not overflow by providing a runoff which permits excess water within reservoir 128 to quickly reach the drain via drain channel 129.

Pump 135 delivers a sanitizing agent such as bleach from sanitizing agent source 133 into the water contained within reservoir 128 via lines 134 and 136 to form the sanitizing solution utilized to clean hopper 16. Once the sanitizing solution is formed, pump 138 pumps the solution into hopper 16 via lines 137 and 139. The outlets from line 139 communicate with the interior of hopper 16 through openings in hopper 16 and secures to hopper 16 using any suitable means such as a brackets. Further, nozzle 140–142 connect to the outlets from line 139 to spray the inside of the hopper with sanitizing solution, thereby sanitizing the hopper's inner surface.

Sanitizing system 120 removes ice stored in hopper 16 during periods when ice bagger 10 remains idle for longer than a set time period (30 minutes in this first embodiment) to prevent old ice from being dispensed to customers. Additionally, if ice sits within hopper for an extended time period, it will freeze together to form large chunks unsuitable for bagging. Thus, after the expiration of the set time period, solenoid valve 123 opens for a predetermined time period (15 minutes in this first embodiment) to allow the delivery of water into hopper 16 via line 121. The water entering hopper 16 melts the ice within and forces the melted ice into reservoir 128 via outlet 125 and overflow 126 of hopper 16.

Furthermore, sanitizing system 120 periodically sprays sanitizing solution within hopper 16 to kill any residue bacteria. Illustratively, at the expiration of a second set time period (30 days in this first embodiment), solenoid valve 123 activates for a predetermined time period (15 minutes in this first embodiment) to permit water delivery into hopper 16. The water entering hopper 16 melts the ice and forces the resulting water into reservoir 128 as previously described. Solenoid valve 123 then deactivates and pump 135 activates for a predetermined time period (10 seconds in this first embodiment) to pump sanitizing agent from sanitizing agent source 133 into reservoir 128 to form a sanitizing solution.

After pump 135 deactivates, pump 138 activates for a first predetermined time period (30 minutes in this first embodiment) to deliver the sanitizing solution into hopper 16 where it cleans hopper 16 and returns to reservoir 128 for recirculation. Additionally, during the 30 minute sanitation cycle, pump 135 periodically reactivates a predetermined number of times (3 in this first embodiment) to refresh the sanitizing solution by pumping additional sanitizing agent into reservoir 128. At the expiration of the 30 minute sanitation cycle, pump 138 deactivates so that the sanitizing solution returns to reservoir 128 where it enters drain channel 129 via hole 130 and spillway 143 for delivery to the drain.

Once the sanitizing solution drains from reservoir 128, solenoid valve 123 reactuates to refill reservoir 128 with water. After reservoir 128 fills with water, pump 138 reactivates for a second predetermined time period (15 minutes in this first embodiment) to deliver the water into hopper 16 where it rinses hopper 16 and returns to reservoir 128 for recirculation. Pump 138 circulates the water contained in reservoir 128 for its second predetermined time period (15 minutes in this first embodiment) to permit the rinsing of any residual sanitizing solution from hopper 16.

At the completion of the rinse cycle, ice maker 12 activates to make and deliver a first harvest of ice into hopper 16. During the filling of hopper 16 with ice, the water within reservoir 128 drains via drain channel 129. When hopper 16 fills with ice, solenoid valve 123 opens for a predetermined time period (15 minutes in this first embodiment) to again allow the delivery of water into hopper 16 via line 121. The water entering hopper 16 melts the first harvest of ice and forces the melted ice into reservoir 128 via outlet 125 and overflow 126 of hopper 16. Sanitizing system 120 removes the first harvest of ice within hopper 16 at the completion of a sanitation cycle to ensure no residual sanitizing solution is bagged with the ice. After solenoid valve 123 closes at the end of the predetermined time period, ice bagging unit 13 resumes normal ice bagging operations.

Figure 14:
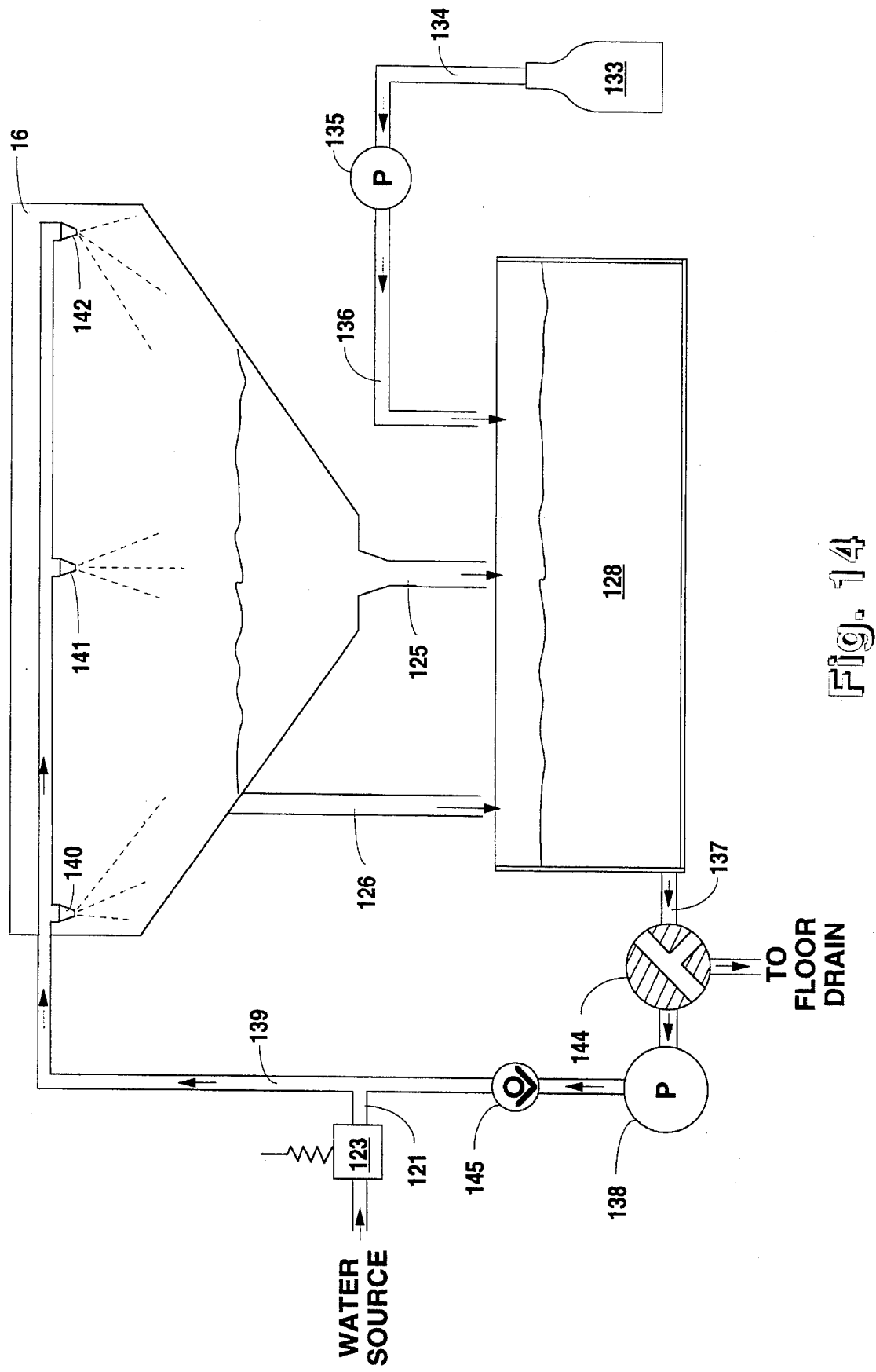
FIG. 14 is a schematic diagram depicting a second embodiment of the sanitizing system of the present invention.

Referring to FIG. 14, the second embodiment of sanitizing system 120 will be described. In the second embodiment of sanitizing system 120, line 121 connects at a T connection with line 139 to feed water into hopper 16 through nozzles 140–142 of line 139. To ensure water delivered from the water source does not flow into pump 138, line 139 includes check valve 145 which prevents water flow to pump 138 from the water source. Furthermore, baffle 127 has been eliminated so that pan 124 forms a single reservoir. With the elimination of baffle 127, outlet 131 and line 132 have been removed and line 137 connected to both pump 138 and the drain via valve 144 which comprises a solenoid operated three-way valve.

During normal operation of ice bagging unit 13 and the flushing of old ice from hopper 16 as previously described, valve 144 remains open to connect pan to the drain thereby preventing it from overflowing. However, to sanitize hopper 16, solenoid valve 123 opens for a predetermined time period (15 minutes in this second embodiment) to permit water delivery into hopper 16 via line 139 and nozzles 140–142. That water melts the ice within hopper 16 and flushes the resulting ice water into pan 124 via outlet 125 and overflow 126. Near the end of the flush cycle, valve 144 closes as shown in FIG. 14 to prevent water flow from pan 124.

Once solenoid valve 123 deactuates, pump 135 activates for a predetermined time period (10 seconds in this second embodiment) to pump sanitizing agent from sanitizing agent source 133 to the water contained in pan 124. When pump 135 deactivates, valve 144 opens to allow the sanitizing solution to flow from pan 124 to pump 138. Next, pump 138 activates for a first predetermined period (30 minutes in this second embodiment) to pump the sanitizing solution into hopper 16 via line 139 and nozzles 140–142. At the expiration of the 30 minute sanitation cycle, pump 138 deactivates, whereupon valve 144 moves to its initial position connecting pan 124 to the drain so that the sanitizing solution drains from pan 124.

After the sanitizing solution drains from pan 124, valve 144 moves back to its position connecting pan 124 to pump 138, and solenoid valve 123 again opens to fill pan 124. Once pan 124 fills, solenoid valve 123 deactuates and pump 138 activates for a second predetermined time period (15 minutes in this second embodiment) to provide a water rinse which removes residual sanitizing solution from the inside of hopper 16. At the expiration of the rinse period, pump 138 deactivates and valve 144 again moves to its initial position connecting pan 124 with the drain.

Additionally, ice maker 12 activates to make and deliver a first harvest of ice into hopper 16. When hopper 16 fills with ice, solenoid valve 123 opens for a predetermined time period (15 minutes in this second embodiment) to again allow the deliver of water into hopper 16 via line 121. The water entering hopper 16 melts the first harvest of ice and forces the melted ice into pan 124 via outlet 125 and overflow 126 of hopper 16. Sanitizing system 120 removes the first harvest of ice within hopper 16 at the completion of a sanitation cycle to ensure no residual sanitizing solution is bagged with the ice. After solenoid valve 123 closes at the end of the predetermined time period, ice bagging unit 13 resumes normal ice bagging operations.

Figure 15:
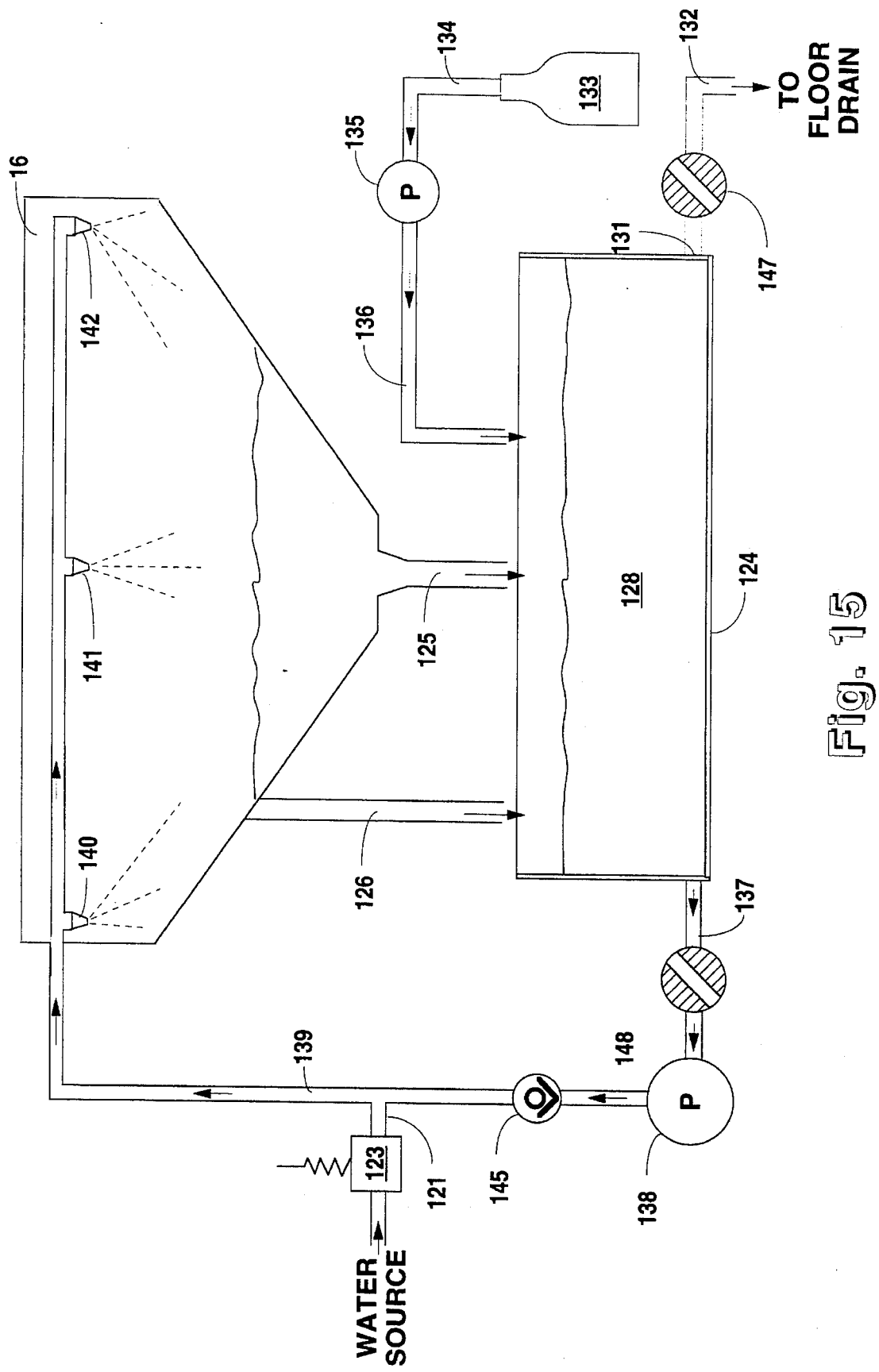
FIG. 15 is a schematic diagram depicting a third embodiment of the sanitizing system of the present invention.

Referring to FIG. 15, the third embodiment of sanitizing system 120 will be described. In the third embodiment of sanitizing system 120, line 121 connects at a T connection with line 139 to feed water into hopper 16 through nozzles 140–142 of line 139. To ensure water delivered from the water source does not flow into pump 138, line 139 includes check valve 145 which prevents water flow to pump 138 from the water source. Furthermore, baffle 127 has been eliminated so that pan 124 forms a single reservoir. With the elimination of baffle 127, line 132 includes valve 147 to control the flow of water and sanitizing solution from outlet 131 of pan 124. Additionally, line 137 includes valve 148 to control the flow of sanitizing solution from pan 124 to pump 138. Both valves 147 and 148 comprise a solenoid operated two-way valve.

During normal operation of ice bagging unit 13 and the flushing of old ice from hopper 16 as previously described, valve 148 closes to block pump 138 from pan 124, while valve 147 opens to connect pan 124 to the drain thereby preventing it from overflowing. However, to sanitize hopper 16, solenoid valve 123 opens for a predetermined time period (15 minutes in this third embodiment) to permit water delivery into hopper 16 via line 139 and nozzles 140–142. That water melts the ice within hopper 16 and flushes the resulting ice water into pan 124 via outlet 125 and overflow 126. Near the end of the flush cycle, valve 147 closes as shown in FIG. 15 to prevent water flow from pan 124.

When solenoid valve 123 deactuates, pump 135 activates for a predetermined time period (10 seconds in this third embodiment) to pump sanitizing agent from sanitizing agent source 133 to the water contained in pan 124. Once pump 135 deactivates, valve 148 opens to allow the sanitizing solution to flow from pan 124 to pump 138. Next, pump 138 activates for a first predetermined time period (30 minutes in this third embodiment) to pump the sanitizing solution into hopper 16 via line 139 and nozzles 140–142. At the expiration of the 30 minute sanitation cycle, pump 138 deactivates, whereupon valve 148 closes and valve 147 opens to connect pan 124 to the drain which removes the sanitizing solution from pan 124.

After the sanitizing solution drains from pan 124, valve 147 closes while valve 148 opens. Solenoid valve 123 then opens to fill pan 124 with water. Once pan 124 fills, solenoid valve 123 deactuates and pump 138 activates for a second predetermined time period (15 minutes in this third embodiment) to provide a water rinse which removes residual sanitizing solution from the inside of hopper 16. At the expiration of the rinse period, pump 138 deactivates while valve 148 closes and valve 147 opens to connect pan 124 to the drain.

Furthermore, ice maker 12 activates to make and deliver a first harvest of ice into hopper 16. When hopper 16 fills with ice, solenoid valve 123 opens for a predetermined time period (15 minutes in this third embodiment) to again allow the delivery of water into hopper 16 via line 121. The water entering hopper 16 melts the first harvest of ice and forces the melted ice into pan 124 via outlet 125 and overflow 126 of hopper 16. Sanitizing system 120 removes the first harvest of ice within hopper 16 at the completion of a sanitation cycle to ensure no residual sanitizing solution is bagged with the ice. After solenoid valve 123 closes at the end of the predetermined time period, ice bagging unit 13 resumes normal ice bagging operations.

Although the sanitizing of hopper 15 has not been described, the components and operation of its sanitizing system are identical to sanitizing system 120 in each of the three embodiments.

Figure 16:
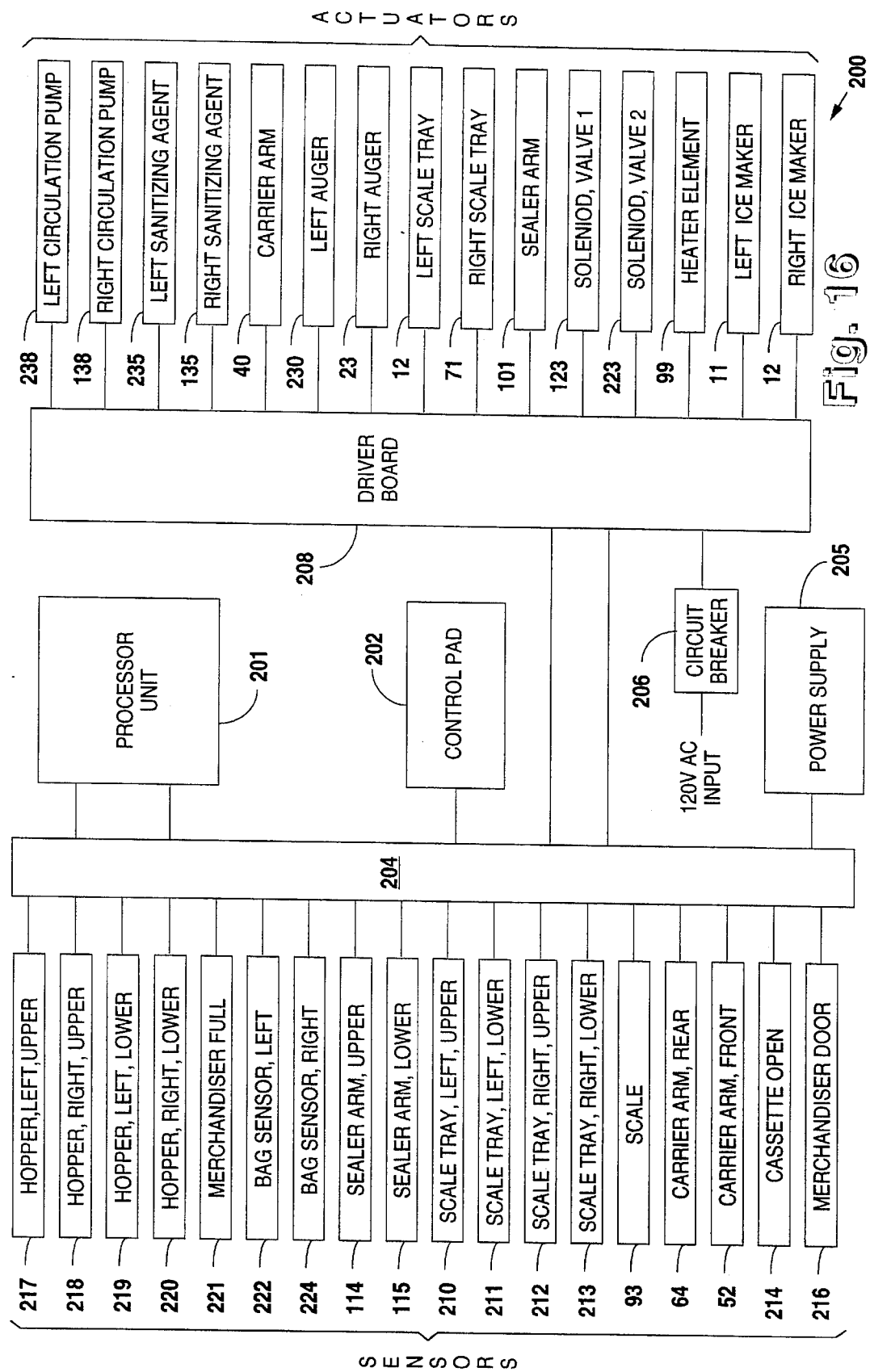
FIG. 16 is a schematic diagram depicting the control system for the present invention.

Referring to FIG. 16, control system 200 of ice bagging unit 10 will be described. Control system 200 comprises processor unit 201, operator control 203, interconnect board 204, power supply 205, and driver board 208. In the preferred embodiment, an 8031 processor and associated RAM and ROM implement processor unit 201. Power supply 205 provides the 5V DC bias necessary to operate processor unit 201 and operator control 203. Additionally, interconnect board 204 provides connection points which permit the electrical coupling of processor unit 201, operator control 203, power supply 205, driver board 208, and the various sensors necessary to the operation of control system 200 as depicted in FIG. 16. The sensors utilized in ice bagger 10 comprise photo-optic sensors that develop a digital signal readable by the 8031 processor of processor unit 201 when tripped.

Driver board 208 comprises a plurality of relays, the number of which corresponds to the number of actuators depicted in FIG. 16. Each relay connects to one of the actuators and to a 120 VAC input such as a standard public power line. The relays further connect to interconnect board 204 to receive control signals from processing unit 201. The received control signals regulate the activation of the relays to control the delivery of the 120 VAC input to each actuator. Additionally, circuit breaker 206 trips in response to power surges or power overloads to prevent damage to the actuators of ice bagger 10.

Operator control 203 comprises a key pad which allows the manipulation of ice bagger 10 and a numeric key pad which permits an operator to input system control values (see FIG. 1). Operator control 203 further comprises a liquid crystal display (LCD) which displays the operator input values during their entry and the number of bags filled with ice during bagging operations. The key pad allows a system operator to select one of a manual, standby, or automatic modes of operation for ice bagger 10. In the standby mode, ice bagger 10 shuts down, however in the manual mode a system operator can manually control bag carrier 39, sealer arm 100, scale housing 66, and the delivery of into a bag held open underneath chute 19. The numeric key pad permits the system operator to input the automatic mode activation times for heating element 99 and for auger motors 23 and 230. Thus, when the system operator selects the automatic mode, processor unit 201 controls the operation of ice bagger 10 to sequentially fill bags with ice and deliver them into merchandiser 14.

Hopper 15 includes sensor 217 mounted in its upper portion and sensor 219 mounted in its lower portion. Similarly, hopper 16 includes sensor 218 mounted in its upper portion and sensor 220 mounted in its lower portion. Sensors 219 and 220 reside in the lower portions of their respective hoppers 15 and 16 to inform processor unit 201 if sufficient ice resides within the hoppers for bagging operations to proceed. That is, sensors 219 and 220 trip in response to any ice deficiency to provide signals indicating that deficiency to processor unit 201.

Processor unit 201 receives those signals and generates control signals received by driver board 208. The relays controlling the operation of ice makers 11 and 12 receive the control signals and actuate to deliver the 120 VAC input to ice makers 11 and 12. Ice makers 11 and 12 activate to make ice which they deliver into hoppers 15 and 16, respectively. Ice makers 11 and 12 deliver ice into their respective hoppers 15 and 16 until sensors 217 and 218 trip to inform processor unit 201 that hoppers 15 and 16 are full. In response, processor unit 201 deactivates the relays on driver board 208 which connect ice makers 11 and 12 with the 120 VAC input.

Once sensors 219 and 220 produce signals indicating sufficient ice within hoppers 15 and 16, processor unit 201 supplies the relays controlling motors 71 and 72 with control signals which activate the relays to connect motors 71 and 72 with the 120 VAC input. Motors 71 and 72 activate to lower scale housing 66 until sensors 211 and 213 trip to inform processor unit 201 scale housing 66 resides in its fully lower position. In response, processor unit 201 discontinues the control signals to remove power from motor 71 and 72, thereby stopping the lowering of scale housing 66.

After scale housing 66 lowers, processor unit 201 generates a control signal which activates motor 40 to begin the arcing of bag carrier 39 towards bag supply 24. Once bag carrier 39 grasps a bag, sensor 52 trips to provide processor unit 201 with a signal indicating the grasping of the bag. Processor unit 201 then generates a different control signal which activates a different relay to reverse motor 40 and, thus, the direction of travel of bag carrier 39. Bag carrier 39 pulls the bag from bag supply 24 onto guide arms 54 and 55 until it returns to its rear position. When bag carrier 39 reaches its rear position, it trips sensor 64 which informs processor unit 201 to deactivate motor 40. At this point, the bag should be grasped by bag carrier 39 and suspended from bag guides 54 and 55 in a fully open position as shown in FIG. 7A.

In addition to deactivating motor 40 in response to the tripping of sensor 64 by bag carrier 39, processor unit 201 generates a control signal which activates one of auger motors 23 and 230 to begin the delivery of ice from one of hoppers 15 and 16 into the bag. If the bag is fully open, all the ice initially delivered from one of hoppers 15 and 16 will enter the bag thereby allowing processor unit 201 to proceed with the complete filling of the bag. However, if the bag has not been properly opened, the delivered ice will miss the bag and fall into merchandiser 14 because the bag resides incorrectly beneath chute 19. Accordingly, to prevent the equivalent of an entire bag of ice from being dumped into merchandiser 14, control system 200 includes sensors 222 and 224 which sense if the ice exiting chute 19 actually falls into the bag.

Sensors 222 and 224 are positioned on either side of guide arms 54 and 55 and trip in response to the downward movement of guide arms 54 and 55. Specifically, as the ice exits chute 19 and enters the opened bag, it weights the bag so that the bag applies a downward pressure on guide arms 54 and 55. As a result, both guide arms 54 and 55 rotate slightly downward to trip sensors 222 and 224. In response, sensors 222 and 224 each develop a signal which informs processor unit 201 that ice resides within the bag. After receiving a signal from each of sensors 222 and 224, processor unit 201 deactivates the initially activated auger motor 23 or 230 and executes the next step in the ice bagging operation (described herein). Thus, during the proper filling of the bag with ice, the activated auger initially operates only momentarily to deliver a small amount of ice (5–10 particles) from hopper 15 and 16 into the bag. Alternatively, if processor unit 201 fails to receive signals from both sensors 222 and 224 by the expiration of a predetermined time period measured from the initial activation of one of auger motors 23 and 230 (20 seconds in the preferred embodiment), it will suspend ice bagging operations until an ice bagger operator can remove the bag and reset ice bagger 10 to its automatic mode.

In addition to deactivating the activated auger motor (23 or 230) in response to the tripping of sensors 222 and 224, processor unit 201 activates motors 71 and 72 for a predetermined time period (20 seconds in the preferred embodiment) to raise scale housing 66 to an intermediate position which supports the bag. At the expiration of that predetermined time period, processor unit 201 deactivates motors 71 and 72 and reactivates the originally activated auger motor (23 or 230) for a second time period (25 seconds in the preferred embodiment) to partially fill the bag with particulate ice. Once the second time period expires, processor unit 201 again deactivates the auger motor (23 or 230) and reactivates motor 71 and 72. Motors 71 and 72 raise scale housing 66 until sensors 210 and 212 trip to provide signals informing processor unit 201 scale housing 66 has reached its fully raised position. After processor unit 201 receives those signals from sensors 210 and 212, it deactivates motor 71 and 72 and reactivates the originally activated auger motor (23 or 23). The activated auger motor (23 or 230) drives its respective auger to deliver ice into the bag until sensor 93 of scale 65 trips to indicate the desired amount of ice resides within the bag. Processor unit 201 deactivates the activated auger motor (23 or 230) in response to that signal from sensor 93.

Furthermore, after the receipt of a signal from sensor 93, processor unit 201 generates a control signal which activates motor 101 to pivot sealer arm 100 towards heating element 99. As arm sealer arm 100 abuts heater element 99, it forces the upper edges of the sides of the bag against heater element 99 and resets gripper 47, causing the release of the bag. Processor unit 201 drives motor 101 until sealer arm 100 pivots to a position which trips sensor 115. When processor unit 201 receives a signal from sensor 115, it deactivates motor 101 and generates a control signal which activates heater element 99. Processor unit 201 activates heater element 99 for a set time period (0.86 seconds in the preferred embodiment) to allow the heat sealing of the upper edges of the bag. Upon the expiration of the set time period, processor unit 201 deactivates heater element 99 and reactivates motor 101 to raise sealer arm 100. Motor 101 raises sealer arm 100 until sealer arm 100 trips sensor 114 to inform processor unit 201 that sealer arm 100 has been fully raised. In response to that signal, processor unit 201 deactivates motor 101.

In addition to deactivating motor 101, processor unit 201 generates a control signal which activates one of motors 71 and 72 to drop the sealed ice bag into merchandiser 14. For example, if the bag is to be dropped into the right side of merchandiser 14, processor unit 201 activates motor 71 to lower the right end of scale housing 66. Motor 71 lowers the right side of scale housing 66 until sensor 213 trips, whereupon processor unit 201 deactivates motor 71. If ice bagging operations are to continue, processor unit 201 next activates motor 72 to lower the left side of scale housing 66. Processor unit 201 provides a control signal to motor 72 until sensor 211 trips to signal processor unit 201 to deactivate motor 72. Alternatively, if bagging operations are to cease, processor unit 201 reactivates motor 71 to raise scale housing 66. Motor 71 raises scale housing 66 until sensor 212 trips, resulting in processor unit 201 deactivating motor 71.

Sensor 214 provides processor unit 201 with a signal indicating cassette tray 25 has been opened, while sensor 216 provides processor unit 201 with a signal indicating the door of merchandiser 14 has been opened. If processor unit 201 receives signals from either of sensors 214 and 216, processor unit 201 suspends ice bagging operations until it no longer receives a signal from either sensor. That is, processor unit 201 suspends ice bagging operations until either cassette tray 25 or the door of merchandiser 14 has been closed. Additionally, sensor 221 provides processor unit 201 with a signal indicating merchandiser 14 has been filled with ice bags. Upon receipt of that signal, processor unit 201 ceases ice bagging operations until sensor 221 no longer indicates that merchandiser 14 is full.

Processor unit 201 includes a first timer which begins to run whenever ice bagging operations cease. If ice bagging operations have not resumed before the first timer has timed out (30 minutes in the preferred embodiment), processor unit 201 suspends ice bagging operations and generates control signal which activate solenoid valves 123 and 223 for a predetermined time period (15 minutes in the preferred embodiment). With solenoid valves 123 and 223 open, water enters hopper 16 and 15, respectively, to melt the ice and flush the melted ice from the hoppers, thereby preventing old ice from being bagged and sold to the public. At the expiration of the predetermined time period, processor unit 201 deactivates solenoid valves 123 and 223 to stop the flow of water into hoppers 15 and 16.

Processor unit 201 further includes a second timer which determines the frequency with which hoppers 15 and 16 are sanitized (ever 30 days in the preferred embodiment). When the second timer times out, processor unit 201 activates solenoid valves 123 and 223 for a predetermined time period (15 minutes in the preferred embodiment) to flush any ice within the hoppers into the pans of the respective sanitizing systems. Once the predetermined period for flushing has expired, processor unit 201 closes solenoid valves 123 and 223 and activates pumps 135 and 235 for a predetermined time period (10 seconds in the preferred embodiment) to deliver the sanitizing agents into the pans of the sanitizing systems, thereby forming the sanitizing solution.

Processor unit 201 then deactivates pumps 135 and 235 and activates pumps 138 and 238 for a first predetermined period (30 minutes in the preferred embodiment). Pumps 138 and 238 deliver the sanitizing solution into hoppers 15 and 16, respectively to remove any bacteria from hoppers 15 and 16. Additionally, processor unit 201 periodically activates pumps 135 and 235 (3 times in the preferred embodiment) during the sanitizing solution circulation cycle to refresh the sanitizing solution with the sanitizing agent. At the expiration of the sanitizing solution circulation cycle, processor unit 201 deactivates pumps 138 and 238 and reenergizes solenoid valves 123 and 223 to refill the reservoirs of the pans with water. After the pans fill, processor unit 201 reactivates pumps 138 and 238 for a second predetermined time period (15 minutes in the preferred embodiment) to provide a water rinse for hoppers 15 and 16 which removes any residual sanitizing solution from hoppers 15 and 16. When hoppers 15 and 16 have been rinsed, processor unit 201 deactivates pumps 138 and 238.

Furthermore, processor unit 201 activates ice makers 11 and 12, which make and deliver a first harvest of ice into their respective hoppers 15 and 16. During the filling of hoppers 15 and 16 with ice, the rinse water contained within each pan drains. When hoppers 15 and 16 fill with ice, processor unit 201 deactivates ice makers 11 and 12 and actuates solenoid valves 123 and 223 for a predetermined time period (15 minutes in the preferred embodiment) to again allow the delivery of water into hoppers 15 and 16. The water entering hoppers 15 and 16 melts the first harvest of ice and forces the melted ice into the pans via the outlets and overflows of hoppers 15 and 16. The sanitizing systems remove the first harvest of ice within hoppers 15 and 16 at the completion of a sanitation cycle to ensure no residual sanitizing solution is bagged with the ice. After the expiration of the predetermined time period, processor unit 201 closes solenoid valves 123 and 223 and resumes normal ice bagging operations.

To implement the second and third embodiments of sanitizing system 200, processor unit 201 would generate control signals that open and close the three-way water valve or the two two-way water valves, respectively, at the appropriate times as previously described with reference to FIGS. 14 and 15. Furthermore, processor unit 201 would not periodically activate pumps 135 and 235 to refresh the sanitizing solution.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims which follow.

We claim:

1. A method for bagging ice comprising the steps of:

grasping a bag from a bag supply using a bag grasping means and opening said bag underneath an ice delivery means which communicates with an ice storage means;

activating said ice delivery means to deliver ice from said ice storage means into said bag until a sensing means provides a signal indicating ice resides within the bottom of said bag;

deactivating said ice delivery means in response to said signal to stop the delivery of ice into said bag;

raising a scale located underneath said bag from a fully lowered position to an intermediate position which supports said bag;

activating said ice delivery means to deliver ice into said bag for a predetermined period of time;

raising said scale to a fully raised position which further supports said bag;

activating said ice delivery means to deliver ice into said bag until said scale provides a signal indicating said bag is full;

deactivating said ice delivery means in response to said scale signal to stop the delivery of ice into said bag;

sealing said bag to prevent ice from escaping said bag;

releasing said bag from said bag grasping means; and delivering said bag from said scale into an ice bag storage means.

2. The method according to claim 1 further comprising the step of deactivating said ice delivery means and stopping ice bagging operations if, at the expiration of a predetermined period, said sensing means fails to provide said signal indicating ice resides within the bottom of said bag.

3. The method according to claim 1 wherein the step of delivering said bag from said scale into an ice bag storage means further comprises lowering said scale to its fully lowered position and alternately tilting said scale to the left and right to deliver bags of ice to opposite sides of said ice bag storage means.

4. The method according to claim 1 further comprising the steps of:

activating a means for making ice to deliver ice into said ice storage means in response to a signal indicating a low level of ice in said ice storage means; and deactivating said means for making ice in response to a signal indicating a high level of ice in said ice storage means.

* * * * *